(12) United States Patent
Kaneiwa et al.

(10) Patent No.: US 8,748,068 B2
(45) Date of Patent: Jun. 10, 2014

(54) METHOD OF PRODUCING PATTERNED BIREFRINGENT PRODUCT AND BIREFRINGENT PATTERN BUILDING MATERIAL

(75) Inventors: Hideki Kaneiwa, Minami-ashigara (JP); Ichiro Amimori, Minami-ashigara (JP)

(73) Assignee: FUJIFILM Corporation, Tokyo (JP)

( * ) Notice: Subject to any disclaimer, the term of this patent is extended or adjusted under 35 U.S.C. 154(b) by 984 days.

(21) Appl. No.: 12/847,149

(22) Filed: Jul. 30, 2010

(65) Prior Publication Data
US 2011/0025973 A1    Feb. 3, 2011

(30) Foreign Application Priority Data
Jul. 31, 2009   (JP) ................................. 2009-179278

(51) Int. Cl.
*G02B 1/10* (2006.01)
(52) U.S. Cl.
USPC .............................. 430/20; 430/321; 430/330
(58) Field of Classification Search
None
See application file for complete search history.

(56) References Cited

U.S. PATENT DOCUMENTS

| | | | |
|---|---|---|---|
| 5,780,629 A * | 7/1998 | Etzbach et al. ............... | 544/296 |
| 2005/0101752 A1 | 5/2005 | Matsumoto et al. | |
| 2006/0097514 A1 | 5/2006 | Nishimura et al. | |
| 2006/0193999 A1 | 8/2006 | Verall et al. | |
| 2007/0224341 A1 | 9/2007 | Kuntz et al. | |
| 2008/0143926 A1 * | 6/2008 | Amimori et al. ................ | 349/75 |
| 2008/0272337 A1 | 11/2008 | Farrand | |
| 2009/0208673 A1 | 8/2009 | Seki et al. | |
| 2010/0149460 A1 | 6/2010 | Akao et al. | |
| 2010/0157204 A1 | 6/2010 | Ichihashi et al. | |

FOREIGN PATENT DOCUMENTS

| | | |
|---|---|---|
| EP | 1925954 A3 | 5/2008 |
| JP | 63-51193 A | 3/1988 |
| JP | 2002-127647 A | 5/2002 |
| JP | 2003-131187 A | 5/2003 |
| JP | 2004-123882 A | 4/2004 |
| JP | 2005-22292 A | 1/2005 |
| JP | 2006-143862 A | 6/2006 |
| JP | 2007-519941 A | 7/2007 |
| JP | 2008-40512 A | 2/2008 |
| JP | 2008-225437 A | 9/2008 |
| JP | 2008-282009 A | 11/2008 |
| JP | 2009-515818 A | 4/2009 |
| WO | WO 2007/116573 A1 | 10/2007 |
| WO | WO 2008/105320 A1 | 4/2008 |

OTHER PUBLICATIONS

Extended European Search Report in European Application No. 10171568.8 mailed Oct. 20, 2010.
Japanese Office Action for corresponding Application No. 2009-179278 dated Nov. 27, 2012.
Chinese Office Action issued in Chinese Patent Application No. 201010245036.8 on Dec. 27, 2013.

* cited by examiner

*Primary Examiner* — John A. McPherson
(74) *Attorney, Agent, or Firm* — Birch, Stewart, Kolasch & Birch, LLP

(57) ABSTRACT

A method of producing a patterned birefringent product, comprising at least steps [1] to [3] in this order:
[1] producing a birefringent pattern building material comprising at least one optically anisotropic layer, which is formed by a process including:
coating and drying a composition containing at least one rod-like liquid crystalline compound having at least two reactive groups and at least one chiral agent to form a cholesteric liquid crystal phase; and then
subjecting the cholesteric liquid crystal phase to heating or exposure to radiation to form the optically anisotropic layer containing a polymer fixed by polymerization and fixing;
[2] subjecting the birefringent pattern building material to a patterned exposure to light; and,
[3] baking a laminate obtained after the step [2] at 50° C. or higher and 400° C. or lower.

20 Claims, 5 Drawing Sheets

(a)

(b)

(c)

(d)

(e)

(f)

(a) photomask I (b) photomask II (c) photomask III

METHOD OF PRODUCING PATTERNED BIREFRINGENT PRODUCT AND BIREFRINGENT PATTERN BUILDING MATERIAL

FIELD OF THE INVENTION

The present invention relates to a method of producing a patterned birefringent product that can be used for a forgery-preventing means, an optical device, or the like. Further, the present invention relates to a birefringent pattern building material that can be used in the aforementioned method.

BACKGROUND OF THE INVENTION

A special image using an optical anisotropy is used as a medium to identify (discriminate) authenticity, for example, securities, credit cards, and documents. In the use of these media, further improvement in a forgery-preventing property or a design property is desired.

As one of techniques which affect a visual state of the image or a state of the image itself, with the use of an optical anisotropy, there is a technique in which a cholesteric liquid crystal is used as an identification (discrimination) medium, and a reflected light of the cholesteric liquid crystal is detected by visual observation or an optical instrument.

The cholesteric liquid crystal is continuous. However, when the cholesteric liquid crystal is assumed to have a multilayered structure, each of molecular long-axis directions of the liquid crystal is parallel to each other and to the plane of the layer. Each layer overlaps with other layer by rotating inch by inch, thereby forming a sterically spiral structure. Due to this structure, the cholesteric liquid crystal has properties of selectively reflecting a specific color (wavelength). Namely, the cholesteric liquid crystal has characteristics of selectively reflecting to a circularly-polarized light of wavelength $\lambda$ determined by the following formula:

$$\lambda = n \cdot p$$

, wherein p represents a cholesteric pitch that is a distance for the direction factor of the spiral structure to come around by rotation of 360°; and n represents an average refractive index in each layer.

Due to the characteristics, the cholesteric liquid crystal exhibits a special kind of beautiful color. With respect to the image obtained by using a selective reflection of the cholesteric liquid crystal, an image perceived under a normal condition shows a predetermined change by a prescribed operation (putting a filter on the image, declining the image, or the like).

With respect to a low-molecular cholesteric liquid crystal, its cholesteric pitch changes depending on a temperature. In contrast, a high-molecular cholesteric liquid crystal selectively reflects a circularly-polarized light of a specific wavelength regardless of the temperature. For this reason, the high-molecular cholesteric liquid crystal is used in a conventional identification medium. As the identification medium in which the high-molecular cholesteric liquid crystal is used, for example, a forgery-preventing card described in JP-A-63-51193 ("JP-A" means unexamined published Japanese patent application) is known. However, there is a problem in which the high-molecular cholesteric liquid crystal takes time for alignment. Further, thermal resistance is also problematic in the production of the forgery-preventing card, since the aligned cholesteric material is rapidly cooled to fix the alignment. Further, the forgery-preventing card described in JP-A-63-51193 has no pattern and resultantly is not enough in terms of design properties and the like.

In the identification medium described in JP-A-2002-127647, a patterning of the high-molecular cholesteric liquid crystal is performed by etching, a pattern-like heat treatment, or a laser processing. However, the patterning by etching is subjected to the restriction of a substrate. The pattern-like heat treatment has a limited resolution of the pattern. Further, the laser processing has a limited processing speed.

In view of the above situations, a new technique in which a pattern of large area can be effectively formed is desired in the production of the identification medium using a high-molecular cholesteric liquid crystal.

SUMMARY OF THE INVENTION

The present invention resides in a method of producing a patterned birefringent product, comprising at least steps [1] to [3] in this order:

[1] producing a birefringent pattern building material comprising at least one optically anisotropic layer, which is formed by a process including:

coating and drying a composition containing at least one rod-like liquid crystalline compound having at least two reactive groups and at least one chiral agent to form a cholesteric liquid crystal phase; and then subjecting the cholesteric liquid crystal phase to heating or exposure to radiation to form the optically anisotropic layer containing a polymer fixed by polymerization and fixing;

[2] subjecting the birefringent pattern building material to a patterned exposure to light; and,

[3] baking a laminate obtained after the step [2] at 50° C. or higher and 400° C. or lower.

Further, the present invention resides in a product used as a means of preventing forgery, which is obtainable from the method as described in the above item.

Further, the present invention resides in an optical element, which is obtainable from the method as described in the above item.

Further, the present invention resides in a birefringent pattern building material having at least one optically anisotropic layer containing a polymer material that is obtained by a process including:

forming a cholesteric liquid crystal phase by coating and drying a composition containing at least one rod-like liquid crystalline compound having at least two reactive groups each of which has different polymerization condition and at least one chiral agent; and subjecting the cholesteric liquid crystal phase to heating or exposure to radiation to form the optically anisotropic layer containing a polymer fixed by polymerization and fixing.

Other and further features and advantages of the invention will appear more fully from the following description, appropriately referring to the accompanying drawings.

DETAILED DESCRIPTION OF THE INVENTION

Figure 1:
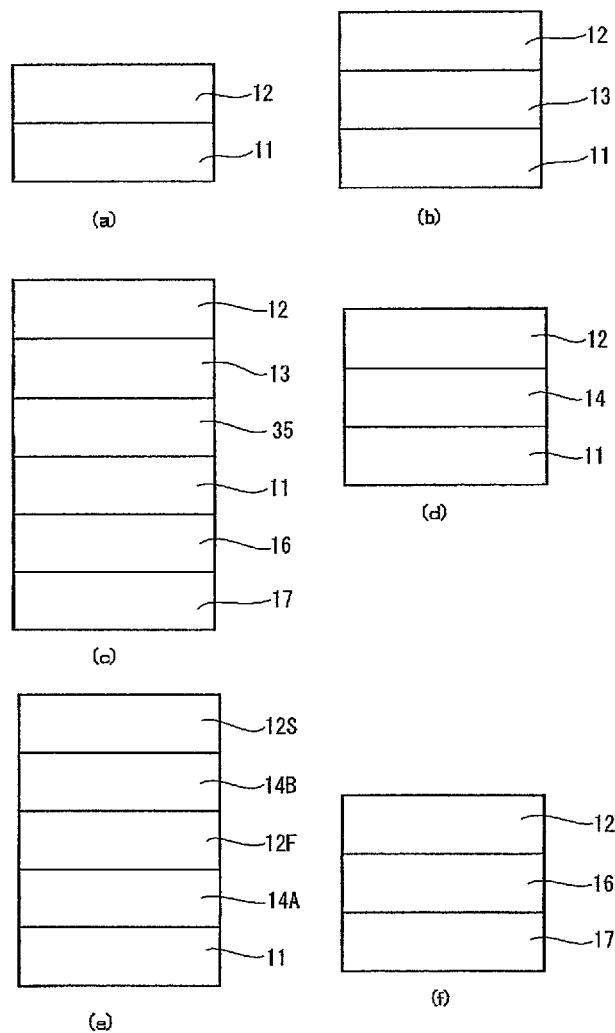
FIGS. 1(a) to 1(f) are schematic sectional views showing examples of layer structure of the birefringent pattern building material according to the present invention.

According to the present invention, there is provided the following means:

(1) A method of producing a patterned birefringent product, comprising at least steps [1] to [3] in this order:

[1] producing a birefringent pattern building material comprising at least one optically anisotropic layer, which is formed by a process including:

coating and drying a composition containing at least one rod-like liquid crystalline compound having at least two reactive groups and at least one chiral agent to form a cholesteric liquid crystal phase; and then subjecting the cholesteric liquid crystal phase to heating or exposure to radiation to form the optically anisotropic layer containing a polymer fixed by polymerization and fixing;

[2] subjecting the birefringent pattern building material to a patterned exposure to light; and,

[3] baking a laminate obtained after the step [2] at 50° C. or higher and 400° C. or lower.

(2) The method as described in the above item (1), wherein the optically anisotropic layer shows a characteristic reflection arising from a cholesteric structure, a peak wavelength of the characteristic reflection being in the range of 50 nm or more and 3000 nm or less, and a peak reflectance being in the range of 2% or more and 100% or less.

(3) The method as described in the above item (2), wherein the peak wavelength of the characteristic reflection is in the range of 300 nm or more and 1600 nm or less.

(4) The method as described in any one of the above items (1) to (3), wherein a cholesteric pitch of the optically anisotropic layer is in the range of 100 nm or more and 2000 nm or less.

(5) The method as described in any one of the above items (1) to (4), wherein a characteristic reflection-disappearance temperature of the optically anisotropic layer is in the range of temperature higher than 20° C.

(6) The method as described in the above item (5), wherein the step [3] is carried out at a temperature equal to or higher than the characteristic reflection-disappearance temperature.

(7) The method as described in any one of the above items (1) to (6), wherein the polymer has a reactive group that is remaining as an unreacted group.

(8) The method as described in any one of the above items (1) to (7), wherein the rod-like liquid crystalline compound has two or more types of reactive groups each of which has different polymerization condition.

(9) The method as described in the above item (8), wherein the rod-like liquid crystalline compound has at least a radically reactive group and a cationically reactive group.

(10) The method as described in the above item (9), wherein the radically reactive group is an acrylic group and/or a methacrylic group, and the cationically reactive group is a vinyl ether group, an oxetanyl group, or an epoxy group.

(11) The method as described in any one of the above items (1) to (10), wherein a concentration of the at least one chiral agent in the composition is in the range of 0.5% by mass or more and 20% by mass or less in terms of solid content.

(12) The method as described in any one of the above items (1) to (11), wherein at least one of the at least one chiral agent has at least one reactive group.

(13) The method as described in any one of the above items (1) to (12), wherein the optically anisotropic layer is modified after being polymerized and fixed.

(14) The method as described in the above item (13), wherein the property modification is performed by contact or immersing of a solution containing at least one of supplementary additives.

(15) The method as described in the above item (14), wherein the at least one of supplementary additives is a photopolymerization initiator.

(16) The method as described in any one of the above items (13) to (15), wherein the property modification is performed in association with the step of laminating another functional layer on the optically anisotropic layer.

(17) The method as described in any one of the above items (1) to (16), wherein the step [1] is performed by transferring a transferring material containing the at least one optically anisotropic layer, onto a target transferring material, the transferring material is formed by a process including:

forming a cholesteric liquid crystal phase by coating and drying a composition containing at least one rod-like liquid crystalline compound having at least two types of reactive groups each of which has different polymerization condition and at least one chiral agent; and, subjecting the cholesteric liquid crystal phase to heating or exposure to radiation to form the optically anisotropic layer containing a polymer fixed by polymerization and fixing.

(18) The method as described in the above item (17), wherein the transferring material has at least [A] an optically anisotropic layer and [B] a transferring adhesive layer laminated in this order on a temporary support.

(19) A product used as a means of preventing forgery, which is obtainable from the method as described in any one of the above items (1) to (18).

(20) An optical element, which is obtainable from the method as described in any one of the above items (1) to (18).

(21) A birefringent pattern building material having at least one optically anisotropic layer containing a polymer material that is obtained by a process including:

forming a cholesteric liquid crystal phase by coating and drying a composition containing at least one rod-like liquid crystalline compound having at least two types of reactive groups each of which has different polymerization condition and at least one chiral agent; and subjecting the cholesteric liquid crystal phase to heating or exposure to radiation to form the optically anisotropic layer containing a polymer fixed by polymerization and fixing.

The "characteristic reflection-disappearance temperature" used in the present invention means a temperature at which a peak reflectance of the characteristic reflection becomes 30% or less of the peak reflectance at 20° C.

In the present specification, "to" denotes a range including numerical values described before and after it as a minimum value and a maximum value.

Hereinafter, the present invention is explained in detail. However, the present invention is not meant to be limited thereto.

(Birefringent Pattern Building Material)

FIGS. 1(*a*) to 1(*f*) are schematic sectional views showing several examples of the birefringent pattern building material. The birefringent pattern building material is a material for preparing birefringent pattern, and a material with which the patterned birefringent product can be prepared by going through the predetermined steps. The birefringent pattern building material shown in FIG. 1(a) is an example having an optically anisotropic layer 12 on a support (substrate) 11. The birefringent pattern building material shown in FIG. 1(b) is an example having an alignment layer 13. The alignment layer 13 functions as a layer for supporting the alignment (orientation) of liquid crystalline compounds, when use is made, as the optically anisotropic layer 12, of a layer formed by coating a substrate with a composition (coating liquid) comprising the rod-like liquid crystalline compounds and chiral agents and then drying the liquid to thereby form a cholesteric liquid crystal phase, and then polymerizing and fixing the compounds by heating or irradiating ionizing radiation to the liquid crystal phase.

The birefringent pattern building material shown in FIG. 1(c) is an example having a post-adhesive layer 16 and a delamination layer 17 under the support 11 in order to be attached to another product after forming the birefringent pattern as well as a reflective layer 35 on the support 11 in order to control the reflection. The birefringent pattern building material shown in FIG. 1(d) is an example having an adhesive layer for transfer 14 between the support 11 and the optically anisotropic layer 12 as it is prepared by using a transferring material. The birefringent pattern building material shown in FIG. 1(e) is an example having plural optically anisotropic layers (12F, 12S; herein, F denotes the first and S denotes the second) and adhesive layers for transfer (14A, 14B; herein, A denotes the first and B denotes the second). The birefringent pattern building material shown in FIG. 1(f) is an example having the post-adhesive layer 16 and the delamination layer 17 in order to be attached to another product after forming the pattern.

(Birefringent Pattern Building Material to be Used as Transferring Material)

FIGS. 2(a) to 2(f) are schematic sectional views showing several examples of the birefringent pattern building material that can be used as a transferring material in the present invention. By using the birefringent pattern building material as a transferring material, a birefringent pattern building material having an optically anisotropic layer on a desired support, a birefringent pattern building material having plural optically anisotropic layers, or a product having plural layers having birefringent pattern, can be readily formed.

Figure 2:
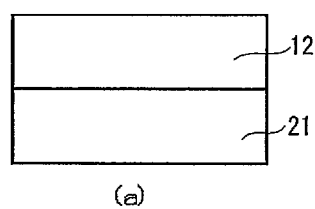
FIGS. 2(a) to 2(f) are schematic sectional views showing examples of the birefringent pattern building material which are used as a transferring material.
Figure 2:
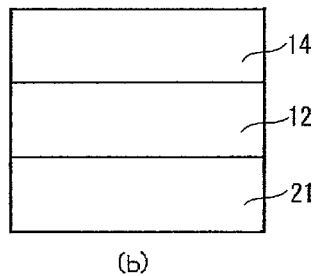
Figure 2:
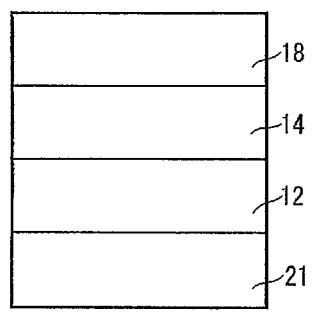
Figure 2:
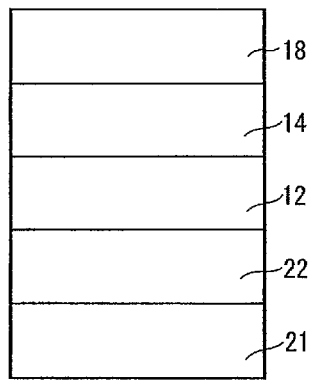
Figure 2:
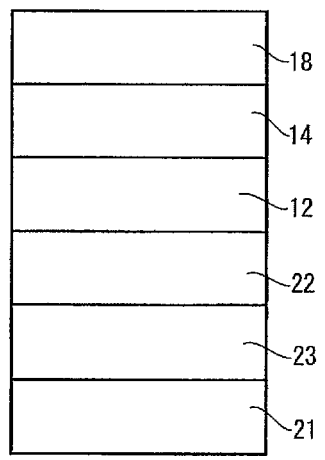
Figure 2:
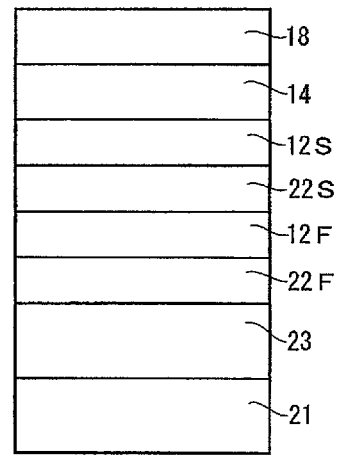

The birefringent pattern building material shown in FIG. 2(a) is an example having an optically anisotropic layer 12 on a temporary support 21. The birefringent pattern building material shown in FIG. 2(b) is an example further having an adhesive layer for transfer 14 on the optically anisotropic layer 12. The birefringent pattern building material shown in FIG. 2(c) is an example further having a surface protecting layer 18 on the adhesive layer for transfer 14. The birefringent pattern building material shown in FIG. 2(d) is an example further having an alignment layer on the temporary support 22 between the temporary support 21 and the optically anisotropic layer 12. The birefringent pattern building material shown in FIG. 2(e) is an example having further a dynamic property controlling layer 23 between the temporary support 21 and the alignment layer 22. The birefringent pattern building material shown in FIG. 2(f) is an example having plural optically anisotropic layers (12F, 12S) and plural alignment layers on the temporary support (22F, 22S; herein, F denotes the first and S denotes the second).

(Patterned Birefringent Product)

FIGS. 3(a) to 3(e) are schematic sectional views showing several examples of the patterned birefringent product which can be obtained by the production method of the present invention using the birefringent pattern building material.

The patterned birefringent product obtainable by the method of the present invention has at least one layer of patterned optically anisotropic layer 112. In the present specification, the term "patterned optically anisotropic layer" means "an optically anisotropic layer having two or more regions different in birefringence from each other in a patterned manner". The embodiment of "different in birefringence" includes an embodiment in which one has birefringence, and the other has no birefringence (the other is an optically isotropic region). The regions having the birefringence equal to each other may be arranged in a continuous or discontinuous state or shape. It is preferable that peak reflectances and/or peak wavelengths of the characteristic reflection shown by each region are different from each other, as a result of the birefringence of each region being different.

Figure 3:
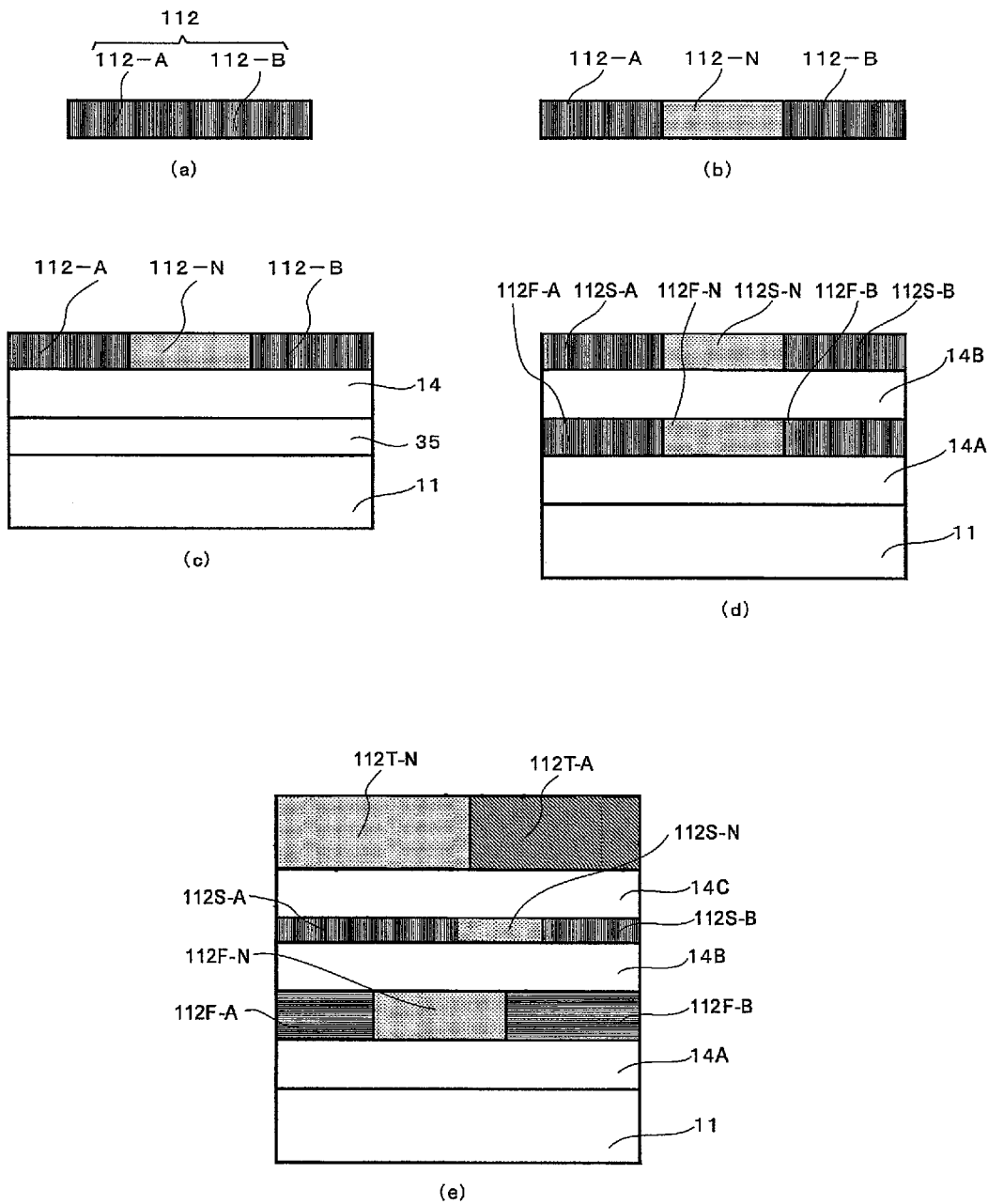
FIGS. 3(a) to 3(e) are schematic sectional views showing examples of patterned birefringent products which are obtainable by the method of the present invention.

The patterned birefringent product shown in FIG. 3(a) is an example consisting of only one patterned optically anisotropic layer 112. The patterned birefringent product produced by the method of the present invention has multiple exposed regions exposed (patterned light exposure was conducted) under exposure conditions different from each other (the first exposed region 112-A and the second exposed region 112-B in FIG. 3(a)), and the "multiple exposed regions exposed under exposure conditions different from each other" have birefringence different from each other. The patterned birefringent product shown in FIG. 3(b) is an example of the product having multiple exposed regions exposed under different exposure conditions (the first exposed region 112-A and the second exposed region 112-B) as well as an unexposed region 112-N. In this case, the unexposed region 112-N shows a birefringence different from that in any exposed region. The patterned birefringent product shown in FIG. 3(c) is an example having a support 11, and a reflective layer 35, an adhesive layer for transfer 14, and a patterned optically anisotropic layer 112, each of which is provided on the support in this order from the support.

The patterned birefringent product may have multiple patterned optically anisotropic layers, and thus, can exhibit a variety of additional functions with the multiple optically anisotropic layers. The patterned birefringent product shown in FIG. 3(d) is an example of such a product formed by laminating multiple optically anisotropic layers and then being subjected to a patterned light exposure. Such a product is useful, for example, in producing a pattern containing reflection of mixed colors of cholesteric colors each of the optically anisotropic layers has. The patterned birefringent product shown in FIG. 3(e) is an example of providing multiple optically anisotropic layers with patterns, which are independent of each other, by repeating the steps consisting of "preparation of optically anisotropic layer (including transfer), patterned light exposure, and baking" multiple times. This type of patterned birefringent product is a useful example, for example, at the time when an image containing a variety of characteristic reflection colors is formed by forming at least two optically anisotropic layers each of characteristic reflection color is different, and then providing each of the optically anisotropic layer with an independent pattern. In FIGS. 3(d) and 3(e), layer 112F represents the first patterned optically anisotropic layer, and layer 112S represents the second patterned optically anisotropic layer. In addition, A, B and N denotes the first exposed region, the second exposed region and the unexposed region, respectively.

Hereinafter, description will be made in detail on the birefringent pattern building material, the method of producing a patterned birefringent product using the same, materials of the patterned birefringent product, and the method of producing the same. However, it is to be noted that the present invention is not limited to the embodiments below. Any other embodiments can be also carried out referring to the description below and known methods.

[Optically Anisotropic Layer]

The optically anisotropic layer used in the birefringent pattern building material of the present invention has a birefringence arising from a cholesteric structure. As a result, the optically anisotropic layer is a layer showing a selective reflection (characteristic reflection) to a circularly-polarized light of wavelength λ that is determined by the following formula:

λ=n·p, wherein p represents a cholesteric pitch, and n represents an average refractive index in each layer.

The optically anisotropic layer in the birefringent pattern building material contains a polymer. By containing the polymer, the optically anisotropic layer can meet various requirements such as birefringence, transparency, solvent-resistance, toughness, and flexibility. The polymer in the optically anisotropic layer is preferred to have an unreacted reactive group. By heating the optically anisotropic layer, its peak reflectance and/or peak wavelength may vary. Especially, when the optically anisotropic layer has a characteristic reflection-disappearance temperature, a substantial reduction in reflectance is caused. However, a degree of variation of the peak reflectance and/or peak wavelength of the characteristic reflection that is caused by heating can be controlled by previously performing an exposure treatment to react a reactive group that is remaining as an unreacted group. Further, in this case, by performing a patterned light exposure, a variation of the peak reflectance and/or peak wavelength of the characteristic reflection can be controlled in the form of a pattern.

Thus, by properly combining an exposure treatment and a heat treatment, it is possible to draw efficiently an optically anisotropic pattern on the optically anisotropic layer used in the birefringent pattern building material of the present invention.

The polymer that is contained in the optically anisotropic layer used in the birefringent pattern building material of the present invention refers to macromolecules that can be produced by bonding a lot of atoms together, for example, a compound having a molecular weight of 3000 or more. Specific examples of the polymer include acrylic polymers, silicone-based polymers, polyesters, polyurethanes, polyethers, and copolymers of these polymers. Further, various monomers may be copolymerized in these polymers. Examples of the monomers include a terminal carboxylic acid acrylic monomer and a liquid crystalline acrylic monomer. Examples of the (unreacted) reactive group include a vinyl group, an acrylic group, a methacrylic group, an epoxy group, and an oxetanyl group. The content of the polymer in the optically anisotropic layer is preferably from 5 to 99% by mass, and more preferably from 10 to 95% by mass.

The optically anisotropic layer may be solid at 20° C., preferably at 30° C., and more preferably at 40° C., because an optically anisotropic layer which is solid at 20° C. can readily be applied to another functional layer, or transferred or attached to a support.

In order to be applied with another functional layer, the optically anisotropic layer is preferred to have solvent-resistance. In the specification, "to have solvent-resistance" means that the peak reflectance of the characteristic reflection after soaked in the subject solvent for two minutes is in the range of 30 to 170%, more preferably 50 to 150%, most preferably 80 to 120%, with respect to the peak reflectance of the characteristic reflection before the soaking. As the subject solvent, examples include water, methanol, ethanol, isopropanol, acetone, methylethylketone, cyclohexanone, propyleneglycolmonomethyletheracetate, N-methylpyrrolidone, hexane, chloroform, and ethyl acetate. Among them, acetone, methylethylketone, cyclohexanone, propyleneglycolmonomethyletheracetate, and N-methylpyrrolidone are preferable, and methylethylketone, cyclohexanone, and propyleneglycol-monomethyletheracetate, and a mixture thereof are most preferable.

It is preferred that the optically anisotropic layer used in the present invention shows a characteristic reflection arising from a cholesteric structure and its peak wavelength is in the range of 50 to 3000 nm and its peak reflectance is in the range of 2 to 100%. By forming an optically anisotropic layer so as to have such the range of peak wavelength and peak reflectance, the characteristic reflection is observed as an infrared light, a visible light, or an ultraviolet light, whereby the optically anisotropic layer can be used for authentication and ornamentation, or communication. The peak wavelength is more preferably in the range of 300 to 1600 nm.

A cholesteric pitch of the optically anisotropic layer is preferably in the range of 100 to 2000 nm, and more preferably from 150 to 1200 nm. Possession of such cholesteric pitch makes it possible to produce an optically anisotropic layer having a peak wavelength around the range of 300 to 1600 nm.

It is preferred that the optically anisotropic layer has a characteristic reflection-disappearance temperature which is preferably higher than 20° C., more preferably from 40° C. to 245° C., and further preferably from 80° C. to 240° C. Possession of the characteristic reflection-disappearance temperature in such range of temperature makes it possible to produce a durable pattern without substantially impairing the efficiency of the patterning step.

The optically anisotropic layer used in the present invention is formed by a process including: forming a cholesteric liquid crystalline phase by coating and drying a composition containing at least one rod-like liquid crystalline compound having at least two reactive groups and at least one chiral agent; and then subjecting the cholesteric liquid crystal phase to heating or exposure to radiation for polymerization and fixing.

Further, as explained below, the optically anisotropic layer according to the present invention may be formed by transfer.

The thickness of the optically anisotropic layer is preferably 0.1 to 20 µm, and more preferably 0.5 to 10 µm.

[Rod-Like Liquid Crystalline Compound]

The liquid crystalline compounds can generally be classified by molecular geometry into rod-like one and discotic one. Each category further includes low-molecular type and high-molecular type. Herein, 'high-molecular' generally refers to a compound having a degree of polymerization of 100 or above ("Kobunshi Butsuri-Soten'i Dainamikusu" (Polymer Physics-Phase Transition Dynamics), by Masao Doi, p. 2, published by Iwanami Shoten, Publishers, 1992). In the present invention, a low molecular rod-like liquid crystalline compound is used because polymerization and fixing are conducted after formation of a cholesteric liquid crystal phase. In the present invention, the compound having two or more reactive groups in a single liquid crystalline molecule is used, because such compound can reduce temperature- or moisture-dependent changes. The rod-like liquid crystalline compound may be a mixture of two or more kinds.

It is also preferred that the rod-like liquid crystalline compound have two or more kinds of reactive groups which have different polymerization condition from each other. In such a case, an optically anisotropic layer comprising polymer having unreacted reactive group can be produced by only polymerizing one type of reactive groups among plural types of reactive groups by selecting polymerization condition. The polymerization condition to be used may be wavelength range of the irradiation of ionized radiation to be used for polymerization and fixing, or mechanism of polymerization.

Preferably, the condition may be polymerization initiator, which can control polymerization of compound having a combination of a radically polymerizable group and a cationically polymerizable group. The combination of acrylic group and/or methacrylic group as the radically polymerizable group and vinyl ether group, oxetanyl group, and/or epoxy group as the cationically polymerizable group is particularly preferred, because the reactivity can be controlled readily.

Examples of the rod-like liquid crystalline compound include azomethine compounds, azoxy compounds, cyanobiphenyl compounds, cyanophenyl esters, benzoate esters, cyclohexanecarboxylic acid phenyl esters, cyanophenylcyclohexane compounds, cyano-substituted phenylpyrimidine compounds, alkoxy-substituted phenylpyrimidine compounds, phenyldioxane compounds, tolan compounds, and alkenylcyclohexylbenzonitrile compounds. Among such low-molecular-weight rod-like liquid crystalline compounds having at least two reactive groups, rod-like liquid crystalline compounds represented by formula (I) are preferred.

$Q^1$-$L^1$-$A^1$-$L^3$-M-$L^4$-$A^2$-$L^2$-$Q^2$    Formula (I)

In formula (I), $Q^1$ and $Q^2$ each independently represent a reactive group; $L^1$, $L^2$, $L^3$ and $L^4$ each independently represent a single bond or a divalent linking group; $A^1$ and $A^2$ each independently represent a spacer group having 2 to 20 carbon atoms; and M represents a mesogen group.

Hereinafter, the rod-like liquid crystalline compound having a reactive group represented by Formula (I) will be described in more detail. In formula (I), $Q^1$ and $Q^2$ each independently represent a reactive group. The polymerization reaction of the reactive group is preferably addition polymerization (including ring opening polymerization) or condensation polymerization. In other words, the reactive group is preferably a reactive group capable of addition polymerization reaction or condensation polymerization reaction. Examples of reactive groups are shown below. In the present specification, "Et" represents an ethyl group, and "Pr" represents a propyl group.

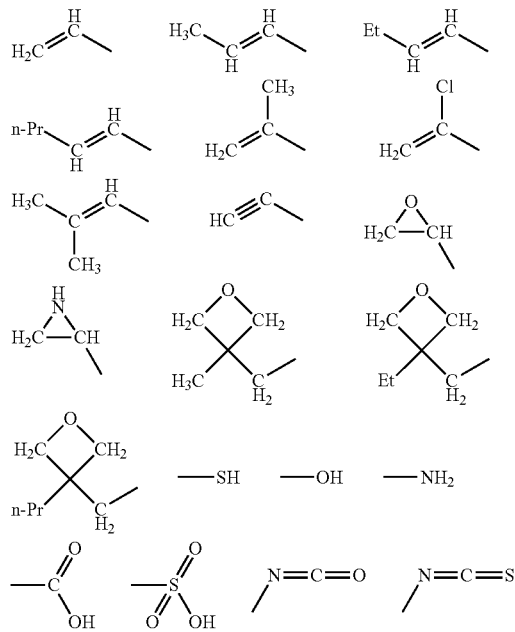

The divalent linking groups represented by $L^1$, $L^2$, $L^3$ and $L^4$ are preferably those selected from the group consisting of —O—, —S—, —CO—, —$NR^2$—, —CO—O—, —O—CO—O—, —CO—$NR^2$—, —$NR^2$—CO—, —O—CO—, —O—CO—$NR^2$—, —$NR^2$—CO—O— and —$NR^2$—CO—$NR^2$—. $R^2$ represents an alkyl group having 2 to 7 carbon atoms or a hydrogen atom. Of the groups represented by a combination of $Q^1$ and $L^1$, or $Q^2$ and $L^2$, $CH_2$=CH—CO—O—, $CH_2$=C($CH_3$)—CO—O—, and $CH_2$=C(Cl)—CO—O— are preferable, and $CH_2$=CH—CO—O— is most preferable.

$A^1$ and $A^2$ each represent a spacer group having 2 to 20 carbon atoms, preferably an alkylene, alkenylene or alkynylene group having 2 to 12 carbon atoms; and particularly preferably an alkylene group. The spacer group is more preferably has a chain form, and may contain non-neighboring oxygen atoms or sulfur atoms. The spacer group may have a substituent group such as a halogen atom (fluorine, chlorine, bromine), a cyano group, a methyl group or an ethyl group.

The mesogen group represented by M may be selected from any known mesogen groups, and is particularly preferably selected from the group represented by formula (II).

—(—$W^1$-$L^5$)$n$-$W^2$—    Formula (II)

In formula (II), $W^1$ and $W^2$ each independently represent a divalent cyclic alkylene or alkenylene group, a divalent arylene group, or a divalent hetero-cyclic group; and $L^5$ represents a single bond or a linking group. Examples of the linking group represented by $L^5$ include those exemplified as examples of $L^1$ to $L^4$ in formula (I) and —$CH_2$—O— and —O—$CH_2$—. In formula (II), n represents 1, 2 or 3.

Examples of $W^1$ and $W^2$ include 1,4-cyclohexanediyl, 1,4-phenylene, pyrimidine-2,5-diyl, pyridine-2,5-diyl, 1,3,4-thiazole-2,5-diyl, 1,3,4-oxadiazole-2,5-diyl, naphthalene-2,6-diyl, naphthalene-1,5-diyl, thiophen-2,5-diyl, pyridazine-3,6-diyl. As for 1,4-cyclohexanediyl, either structural isomers having trans-form or cis-form, or any mixture based on an arbitrary compositional ratio may be used in the present invention, where the trans-form is preferable. Each of $W^1$ and $W^2$ may have a substituent, where the examples of the substituent include a halogen atom (fluorine, chlorine, bromine, iodine), a cyano group, an alkyl group having 1 to 10 carbon atoms (methyl, ethyl, propyl, etc.), an alkoxy group having 1 to 10 carbon atoms (methoxy, ethoxy, etc.), an acyl group having 1 to 10 carbon atoms (formyl, acetyl, etc.), an alkoxycarbonyl group having 1 to 10 carbon atoms (methoxycarbonyl, ethoxycarbonyl, etc.), an acyloxy group having 2 to 10 carbon atoms (acetyloxy, propionyloxy, etc.), a nitro group, a trifluoromethyl group and a difluoromethyl group.

Preferable examples of basic skeleton of the mesogen group represented by formula (II) are listed below. These groups may further be substituted by the above-described substituents.

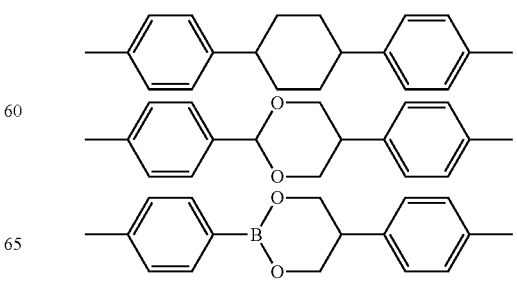

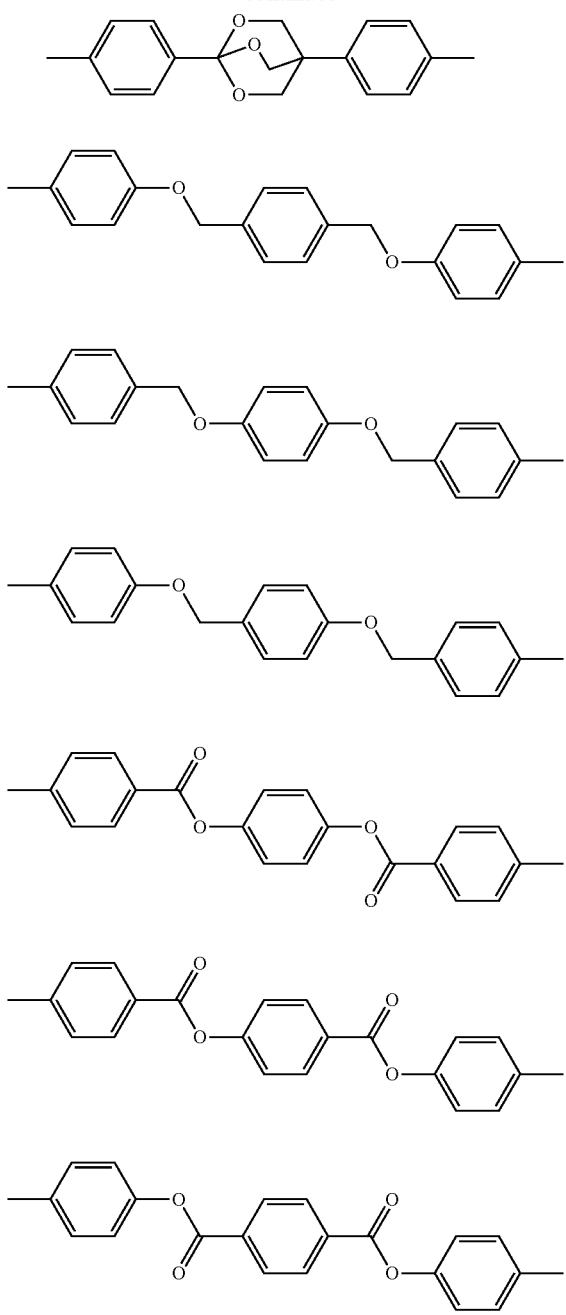
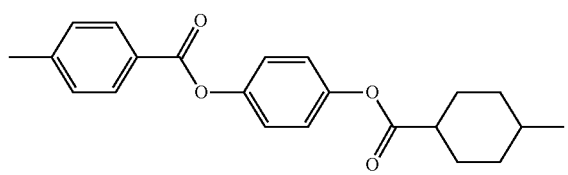
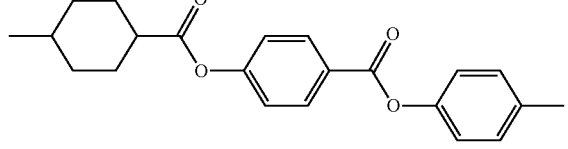
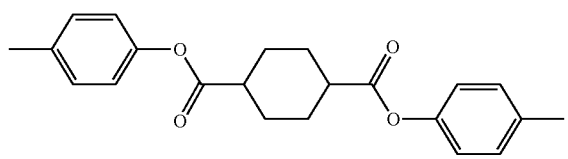
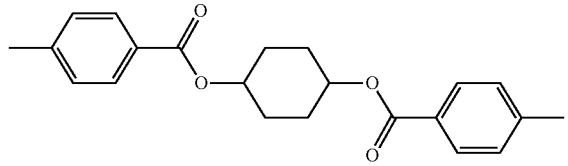
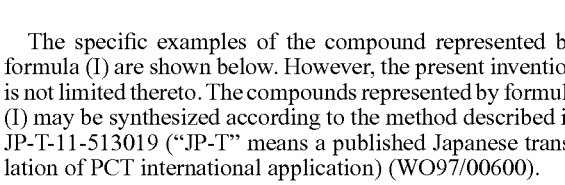
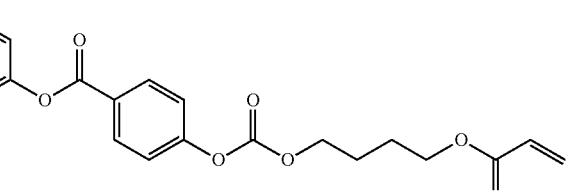
The specific examples of the compound represented by formula (I) are shown below. However, the present invention is not limited thereto. The compounds represented by formula (I) may be synthesized according to the method described in JP-T-11-513019 ("JP-T" means a published Japanese translation of PCT international application) (WO97/00600).
I-1
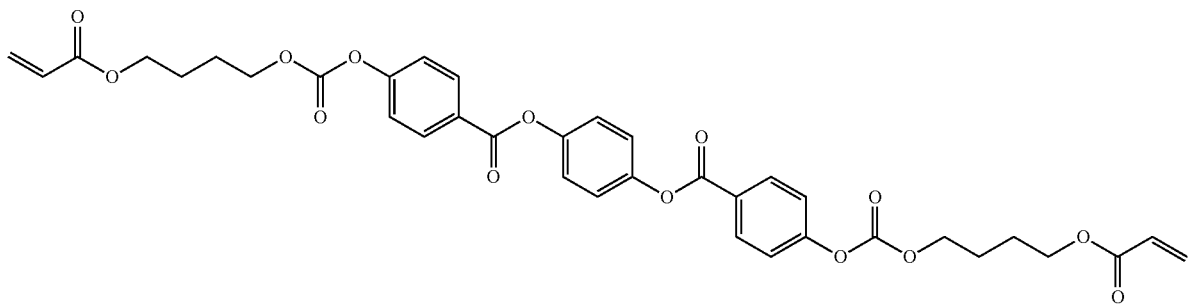

-continued
I-2
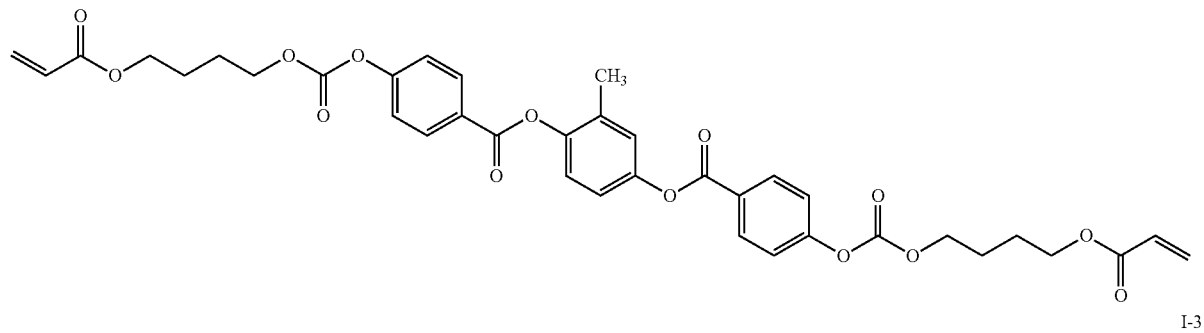
I-3
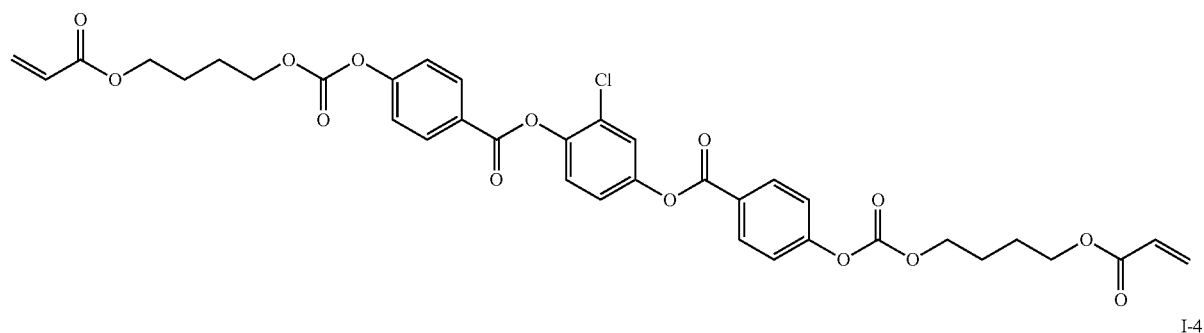
I-4
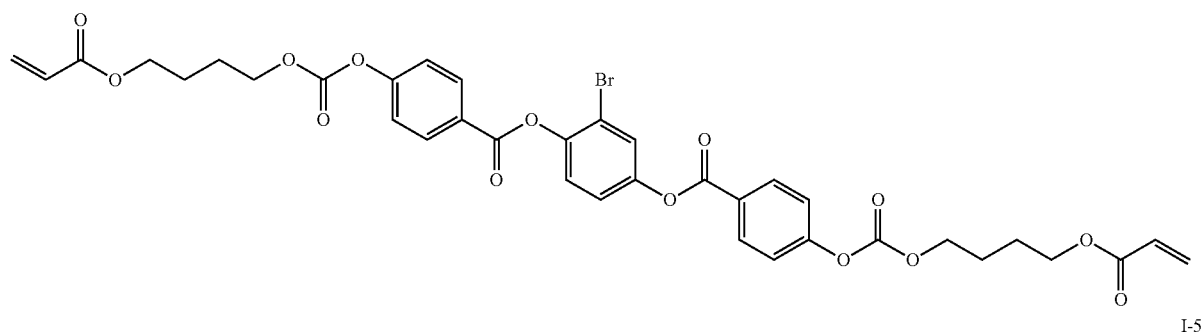
I-5
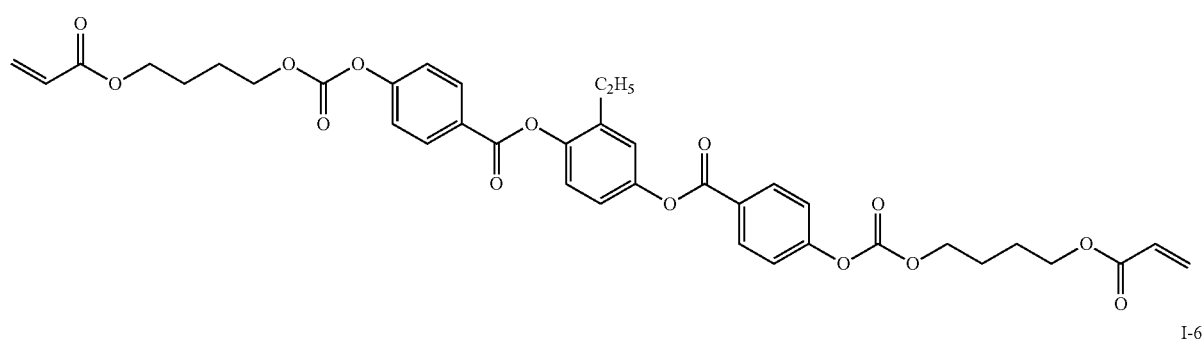
I-6
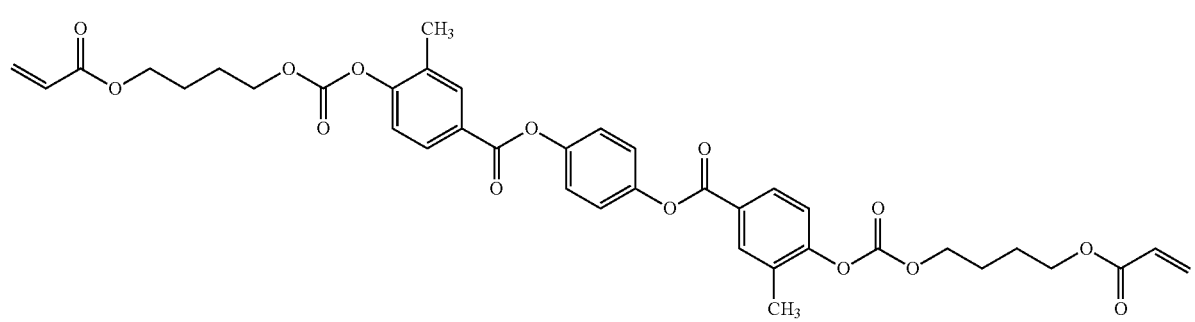

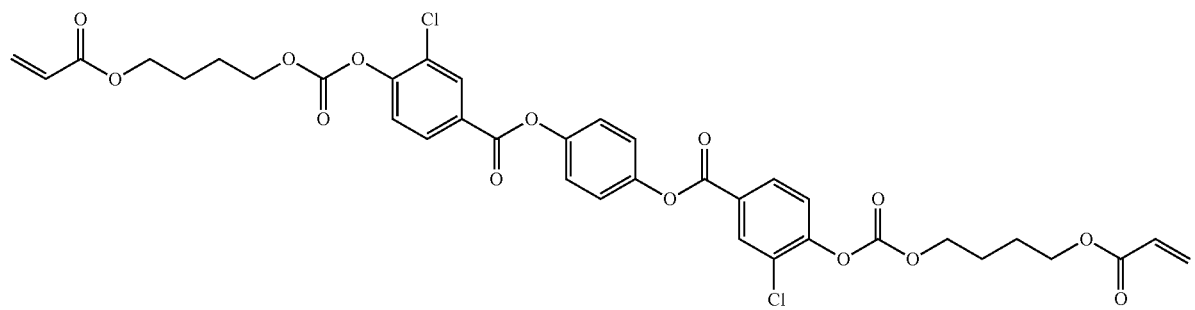
I-7
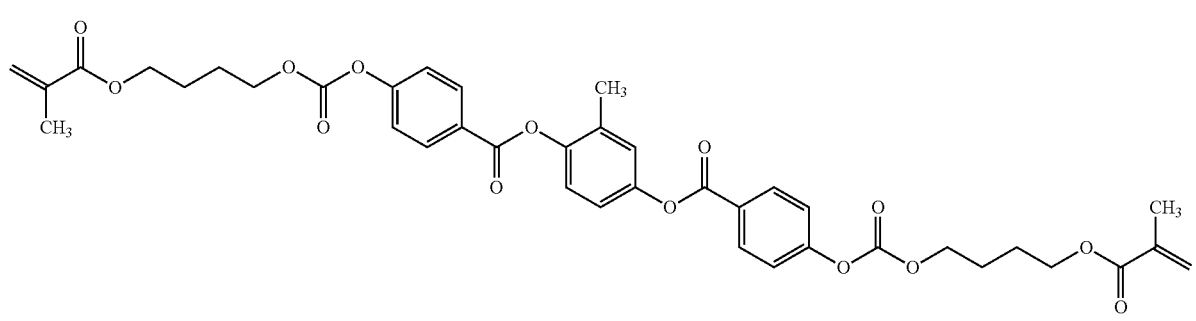
I-8
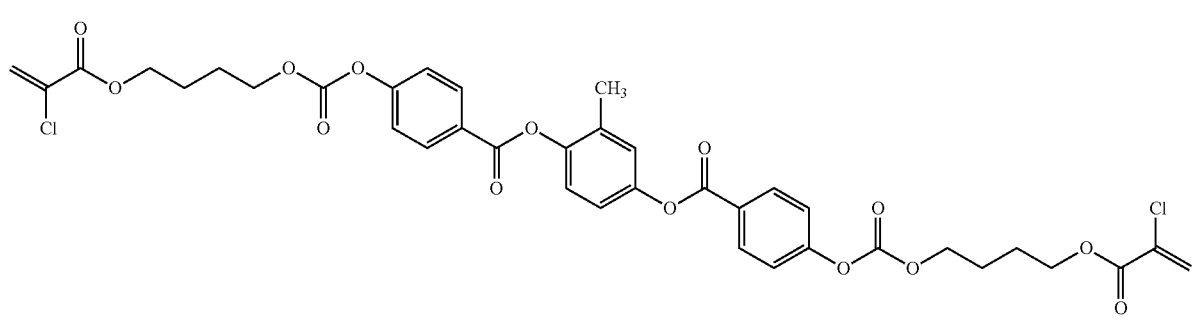
I-9
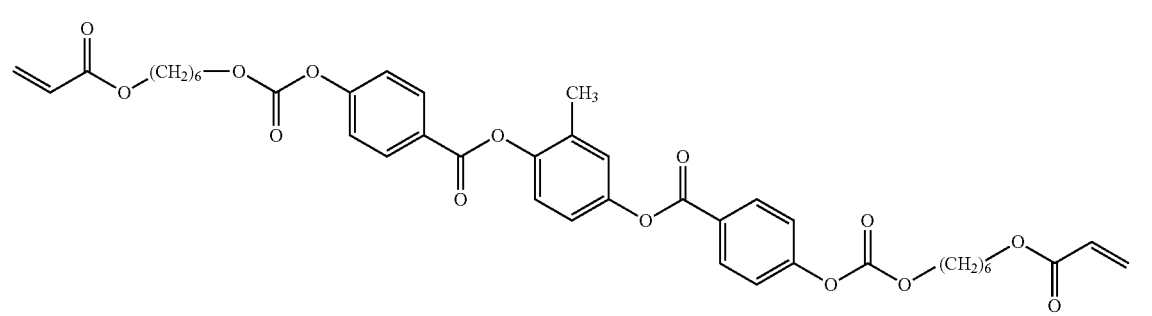
I-10
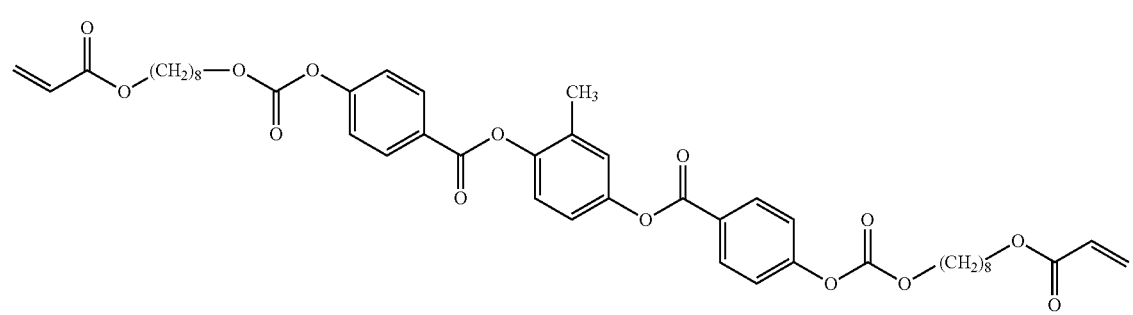
I-11

-continued
I-12
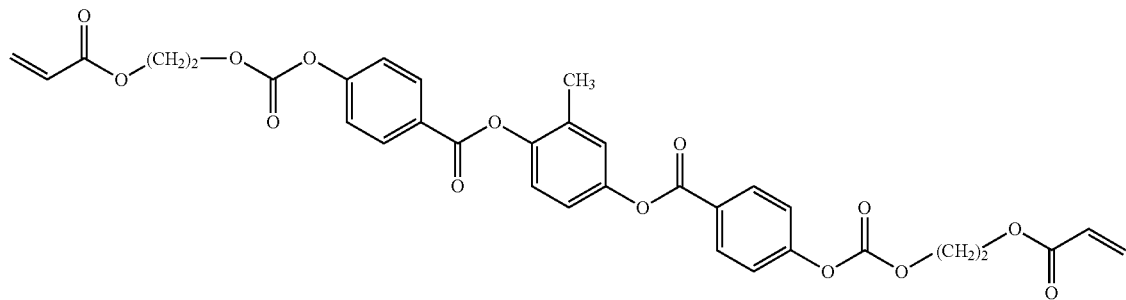
I-13
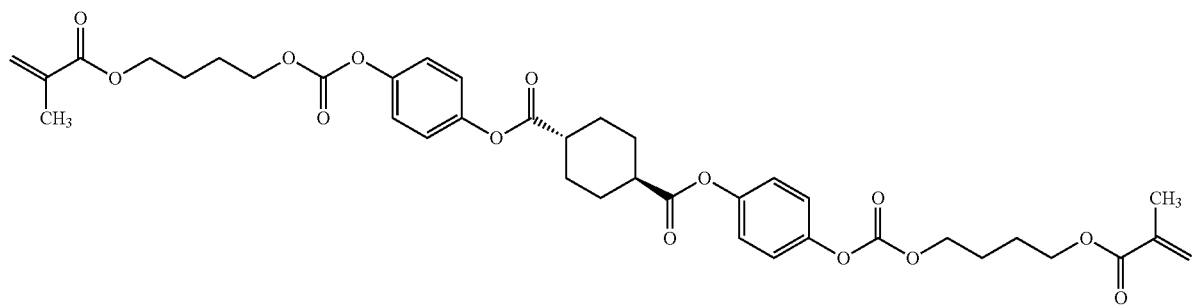
I-14
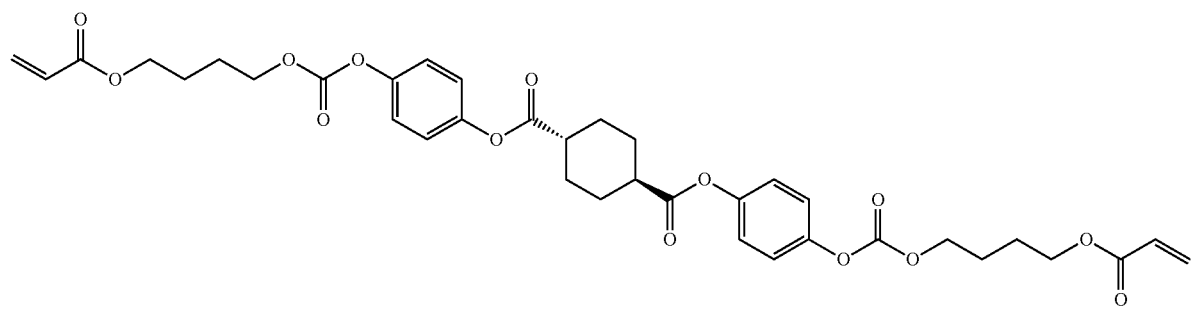
I-15
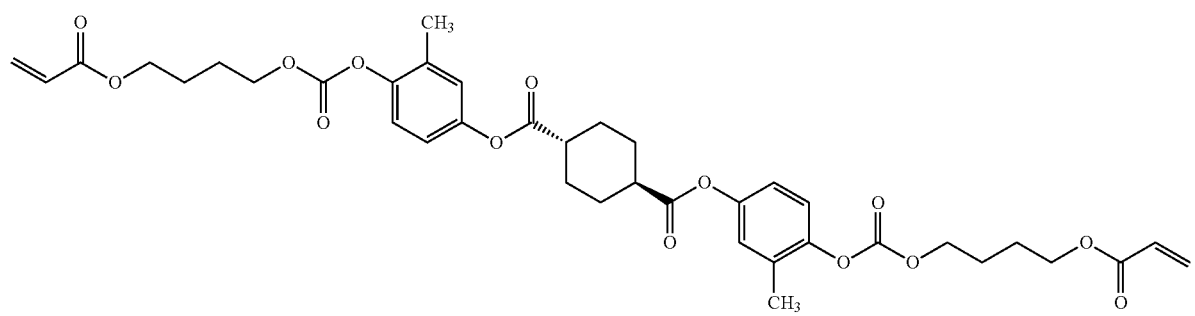
I-16
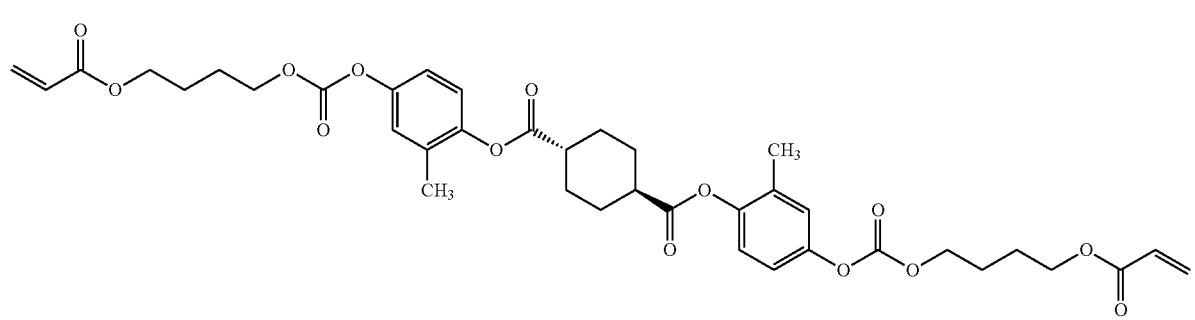

-continued
I-17
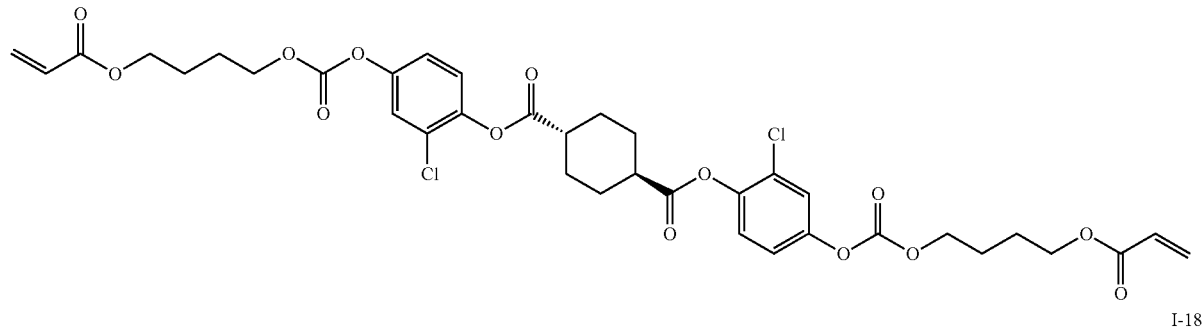
I-18
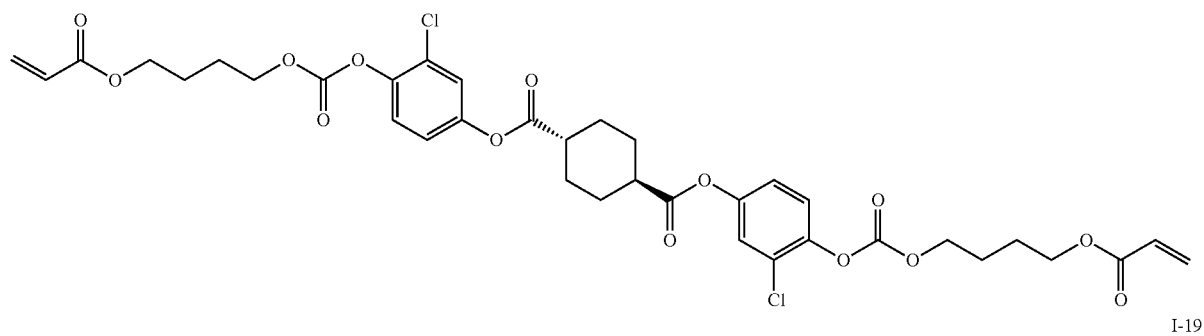
I-19
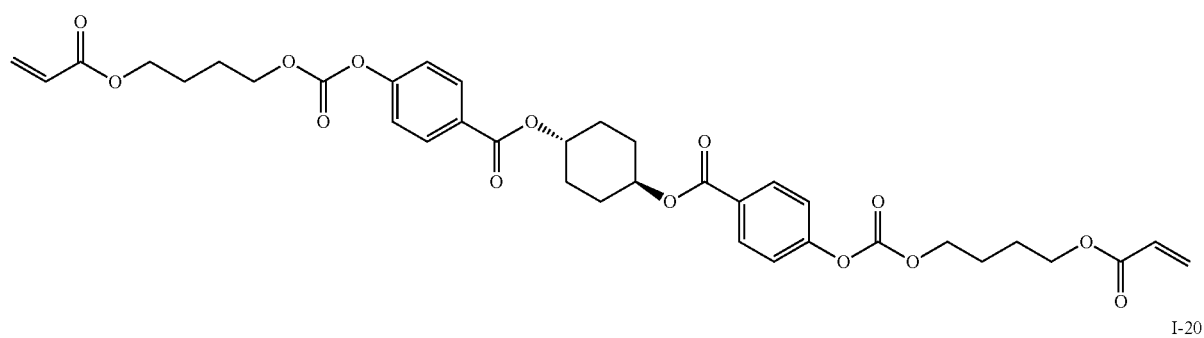
I-20
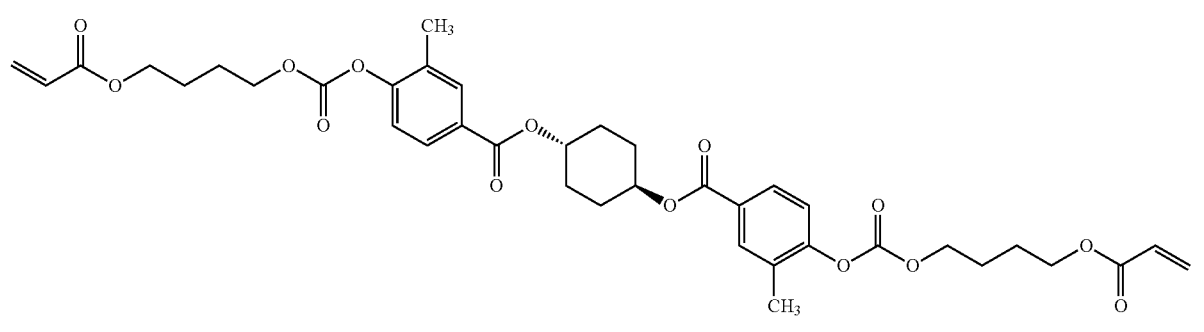
I-21
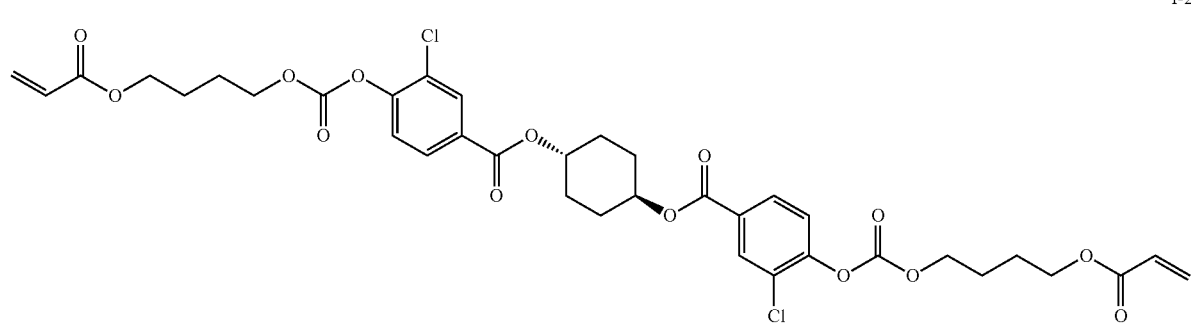

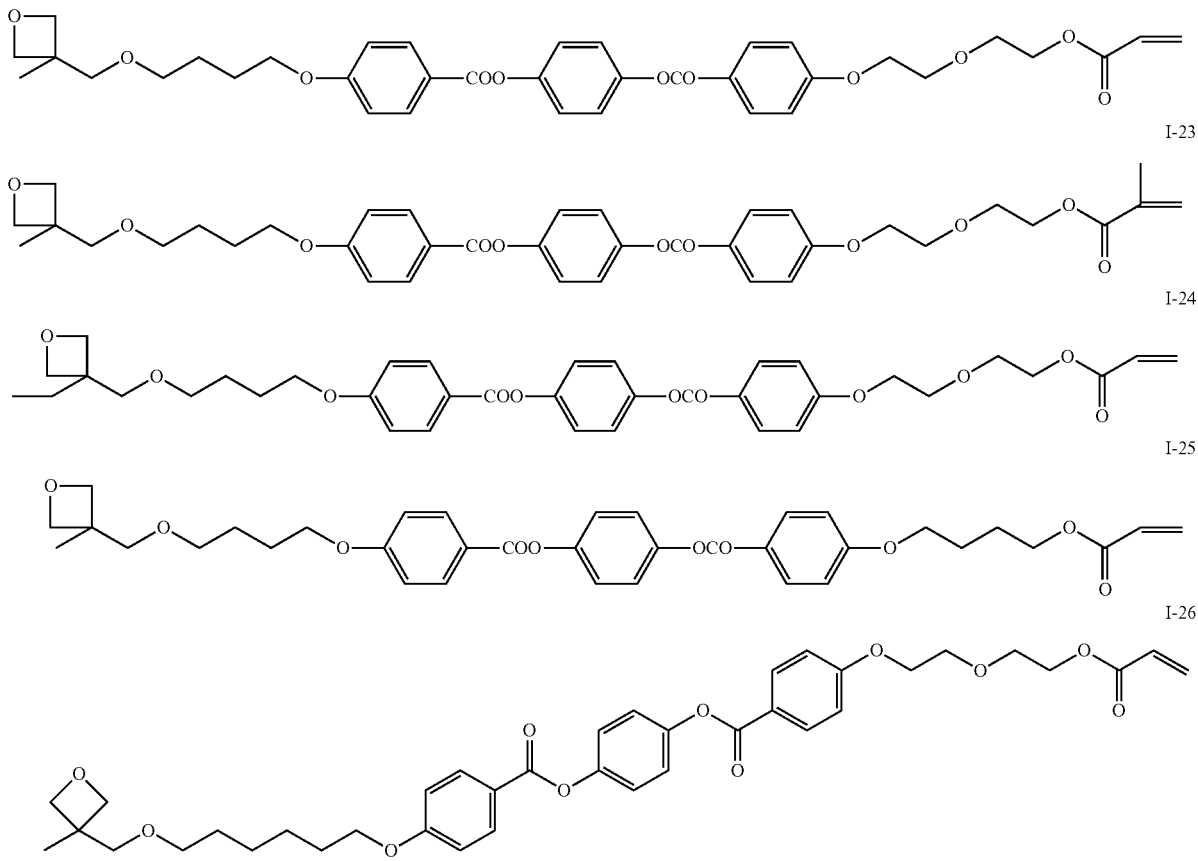

The optically anisotropic layer may be formed by a process including: coating and drying a composition (for example, a coating liquid) containing a rod-like liquid crystalline compound having at least two reactive groups and the below-described chiral agent on a surface of the below-described support thereby forming an aligned (oriented) state that shows a cholesteric liquid crystal phase; and then subjecting the aligned state to heating or exposure to radiation thereby fixing the aligned state.

When two or more optically anisotropic layers formed of the compositions containing liquid crystalline compounds are laminated, the combination of the liquid crystalline compounds is not particularly limited. Further, the combination of the aligned state of each layer is not particularly limited. The optically anisotropic layers may be a laminate formed of layers all comprising the same aligned states, a laminate formed of layers all comprising the different aligned states. For example, optically anisotropic layers each of which has a different peak wavelength of the characteristic reflection may be laminated.

The optically anisotropic layer is preferably formed by applying a coating liquid, which contains at least one liquid crystalline compound, the following chiral agent, polymerization initiator and other additives, on a surface of a substrate described below. Organic solvents are preferably used as a solvent for preparing the coating liquid, and examples thereof include amides (e.g., N,N-dimethylformamide), sulfoxides (e.g., dimethylsulfoxide), heterocyclic compounds (e.g., pyridine), hydrocarbons (e.g., benzene, hexane), alkyl halides (e.g., chloroform, dichloromethane), esters (e.g., methyl acetate, butyl acetate), ketones (e.g., acetone, methylethylketone, cyclohexanone), and ethers (e.g., tetrahydrofuran, 1,2-dimethoxyethane). In particular, alkyl halides and ketones are preferable. Two or more kinds of the solvents in combination may be used.

[Chiral Agent]

A cholesteric liquid crystalline composition may be obtained by mixing the rod-like liquid crystalline compound and an optically active compound (chiral agent). As the optically active compound, can be used a known chiral agent (described for example in Liquid Crystal Device Handbook, Chap. 3, 4-3, Chiral agent for TN and STN, p. 199, Nippon Gakujutsu Shinko-kai, Committee No. 142, 1989). The optically active compound generally contains an asymmetric carbon atom, but an axially asymmetric compound or a planar asymmetric compound, not containing an asymmetric carbon atom, may also be employed as a chiral agent. Examples of the axially asymmetric compound and the planar asymmetric compound include binaphthyl, helicene, paracyclophane and derivatives thereof. The chiral agent may include a polymerizable group (reactive group). When the chiral agent has a polymerizable group, a polymer having a rod-like liquid crystalline recurring unit and an optically active structure may be formed by polymerization reaction of the rod-like liquid crystalline compound. It is preferred that the polymerizable group of the chiral agent is the same as the polymerizable group (reactive group) of the rod-like liquid crystalline compound.

The use amount of the chiral agent is preferably from 0.5 to 20% by mass, and more preferably from 1.5 to 16.0% by mass, with respect to the solid content in the composition (coating liquid) containing the rod-like liquid crystalline compound.

[Fixing of Rod-Like Liquid Crystalline Compounds in an Alignment State]

It is preferred that the rod-like liquid crystalline compounds in an alignment state are fixed without disordering the state. Fixing (Immobilizing) is carried out by the polymerization reaction of the reactive groups contained in the rod-like liquid crystalline compounds by heating or exposure to radiation. The term "radiation" herein used is a collective term including electromagnetic waves such as radio waves, light (infrared light, visual light, ultraviolet light), X-ray or γ-ray; and particle beams such as electron ray (β-ray), proton radiation, neutron radiation, α-ray, or ionic beam. As for the means for fixing, although not limited in particular, heating or exposure to radio waves, light or electron ray is preferably used, and exposure to light or electron ray is more preferably used. It is particularly preferable to use exposure to ultraviolet light. The polymerization reaction in which heating is used in particular is called thermal polymerization reaction, while the polymerization reaction in which exposure to light is used in particular is called photopolymerization reaction. These designations are also used in the specification of the present application.

In the polymerization reaction, an initiator may be used to accelerate the polymerization reaction. The initiator is not particularly limited. Examples of the initiator include thermal polymerization initiator and photopolymerization initiator. The former is used in the thermal polymerization reaction, while the latter in the photopolymerization reaction.

Examples of the photopolymerization reaction include radical polymerization, cationic polymerization and anionic polymerization. Among these polymerization reactions, radical polymerization or cationic polymerization is preferable. Examples of the radical photopolymerization initiators include α-carbonyl compounds (described in U.S. Pat. Nos. 2,367,661 and 2,367,670), acyloin ethers (described in U.S. Pat. No. 2,448,828), α-hydrocarbon-substituted aromatic acyloin compounds (described in U.S. Pat. No. 2,722,512), polynuclear quinone compounds (described in U.S. Pat. Nos. 3,046,127 and 2,951,758), combinations of a triarylimidazole dimer with p-aminophenyl ketone (described in U.S. Pat. No. 3,549,367), acridine and phenazine compounds (described in JP-A-60-105667 and U.S. Pat. No. 4,239,850), and oxadiazol compounds (described in U.S. Pat. No. 4,212,970). As the cationic photopolymerization initiator, examples include organic sulfonium salts, iodonium salts, and phosphonium salts. The organic sulfonium salts are preferred, and triphenyl sulfonium salts are particularly preferred. As a counter ion of these compounds, hexafluoroantimonate, hexafluorophosphate, or the like is preferably used.

It is preferable to use the photopolymerization initiator in an amount of 0.01 to 20 mass %, more preferably 0.5 to 5 mass %, based on the solid content in the coating liquid. In the photoirradiation for polymerizing the liquid crystalline compounds, it is preferable to use ultraviolet ray. The irradiation energy is preferably from 10 mJ/cm$^2$ to 10 J/cm$^2$, more preferably from 25 to 800 mJ/cm$^2$. Illuminance is preferably 10 to 1,000 mW/cm$^2$, more preferably 20 to 500 mW/cm$^2$, and further preferably 40 to 350 mW/cm$^2$. As the irradiation wavelength, the light has a peak falling within the range preferably from 250 to 450 nm, more preferably from 300 to 410 nm. Irradiation may be carried out in an atmosphere of inert gas such as nitrogen gas and/or under heating to facilitate the photopolymerization reaction.

[Fixing the Alignment State of Rod-Like Liquid Crystalline Compounds Having Radically Reactive Group and Cationically Reactive Group]

As described above, it is also preferred that the rod-like liquid crystalline compound has two or more kinds of reactive groups which have different polymerization condition from each other. In such a case, an optically anisotropic layer comprising polymer having unreacted reactive group can be produced by polymerizing only one type of reactive groups among plural types of reactive groups by selecting polymerization condition. The conditions which are suitable for polymerization and fixing of the rod-like liquid crystalline compounds having radically reactive group and cationically reactive group (the aforementioned I-22 to I-25 as specific examples) are explained below.

First, as the polymerization initiator, only a photopolymerization initiator which acts on a reactive group intended to be polymerized is preferred to be used. That is, it is preferred that, only radical photopolymerization initiator is used when radically reactive groups are selectively polymerized, and only cationic photopolymerization initiator is used when cationically reactive groups are selectively polymerized. The amount used of the photopolymerization initiator falls in the range preferably from 0.01 to 20% by mass, more preferably from 0.1 to 8% by mass, and further preferably from 0.5 to 4% by mass of the total solid content in the coating liquid.

Second, light irradiation for the polymerization is preferably conducted by using ultra violet ray. When the irradiation energy and/or illuminance are too high, non-selective reaction of both of the radically reactive group and cationically reactive group is of concern. In view of the above, the irradiation energy is preferably 5 mJ/cm$^2$ to 1 J/cm$^2$, more preferably 10 to 800 mJ/cm$^2$, and particularly preferably 20 to 500 mJ/cm$^2$. The illuminance is preferably 5 to 800 mW/cm$^2$, more preferably 10 to 500 mW/cm$^2$, and particularly preferably 20 to 350 mW/cm$^2$. As the irradiation wavelength, the light has a peak falling within the range preferably from 250 to 450 nm, more preferably from 300 to 410 nm.

Among photopolymerization reaction, the reaction by using a radical photopolymerization initiator is inhibited by oxygen, and the reaction by using a cationic photopolymerization initiator is not inhibited by oxygen. Therefore, when one of the reactive groups of the rod-like liquid crystalline compounds having radically reactive group and cationically reactive group is selectively reacted, it is preferred that the light irradiation is carried out in an atmosphere of inert gas such as nitrogen gas when the radically reactive group is selectively reacted, and in an atmosphere containing oxygen (for example, in air atmosphere) when the cationically reactive group is selectively reacted.

[Horizontal Aligning Agent]

At least one compound selected from the group consisting of the compounds represented by formula (1), (2) or (3), and fluorine-containing homopolymer or copolymer using the monomer represented by formula (4), which are shown below, may be added to the composition used for forming the optically anisotropic layer, in order to prevent the molecules of the rod-like liquid crystalline compounds from aligning vertically.

Formulae (1) to (4) will be described in detail below.

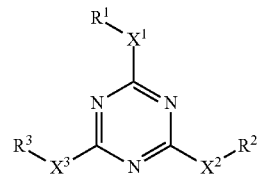

Formula (1)

In formula (1), $R^1$, $R^2$ and $R^3$ each independently represent a hydrogen atom or a substituent; and $X^1$, $X^2$ and $X^3$ each independently represent a single bond or a divalent linking group. As the substituent represented by $R^1$, $R^2$ and $R^3$, preferred is a substituted or unsubstituted alkyl group (preferably an unsubstituted alkyl group or a fluorine-substituted alkyl group), a substituted or unsubstituted aryl group (preferably an aryl group having a fluorine-substituted alkyl group), a substituted or unsubstituted amino group, a substituted or unsubstituted alkoxy group, a substituted or unsubstituted alkylthio group or a halogen atom. In formula (1), the divalent linking group represented by $X^1$, $X^2$ and $X^3$ is preferably selected from the group consisting of an alkylene group, an alkenylene group, a divalent aromatic group, a divalent heterocyclic group, —CO—, —NRa— (in which Ra represents an alkyl group having 1 to 5 carbon atoms, or a hydrogen atom), —O—, —S—, —SO—, —SO$_2$—, and a group made by any combination of two or more kinds thereof; and more preferably a divalent linking group selected from the group consisting of an alkylene group, a phenylene group, —CO—, —NRa—, —O—, —S—, and —SO$_2$—, and a group made by any combination of at least two kinds thereof. The alkylene group preferably has 1 to 12 carbon atoms. The alkenylene group preferably has 2 to 12 carbon atoms. The divalent aromatic group preferably has 6 to 10 carbon atoms.

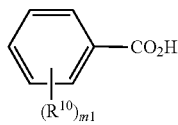

Formula (2)

In formula (2), $R^{10}$ represents a substituent, and m1 represents an integer of 0 to 5. When m is 2 or more, plural $R^{10}$'s may be the same as or different from each other. Preferable examples of the substituent represented by $R^{10}$ are the same as the examples listed above for each of $R^1$, $R^2$ and $R^3$. m1 is preferably an integer of 1 to 3, more preferably 2 or 3.

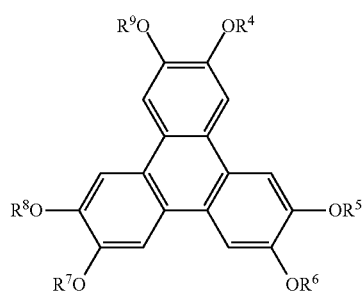

Formula (3)

In formula (3), $R^4$, $R^5$, $R^6$, $R^7$, $R^8$ and $R^9$ each independently represent a hydrogen atom or a substituent. Preferable examples of the substituent represented by each of $R^4$, $R^5$, $R^6$, $R^7$, $R^8$ and $R^9$ are the same as the examples listed above for each of $R^1$, $R^2$ and $R^3$ in formula (1). Examples of the horizontal aligning agent, which can be used in the present invention, include those described in paragraphs [0092] to [0096] in JP-A-2005-099248 and the methods of synthesizing such compounds are described in the document.

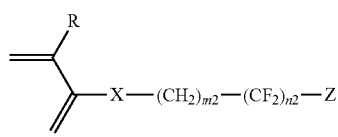

Formula (4)

In formula (4), R represents a hydrogen atom or a methyl group, X represents an oxygen atom or a sulfur atom, Z represents a hydrogen atom or a fluorine atom; m2 represents an integer of 1 to 6, n2 represents an integer of 1 to 12. In addition to the fluorine-containing polymer synthesized by using the monomer represented by formula (4), the compounds described in JP-A-2005-206638 and JP-A-2006-91205 as a polymer for improving unevenness in coating can be used as horizontal aligning agents. The methods of synthesizing the compounds are also described in the publications.

The amount of the horizontal aligning agents added is preferably 0.01 to 20% by mass, more preferably 0.01 to 10% by mass, and most preferably 0.02 to 1% by mass with respect to the mass of the liquid crystalline compound. The compounds represented by any of the aforementioned formulae (1) to (4) may be used singly, or two or more types of them may be used in combination.

[Post-Treatment of Optically Anisotropic Layer (Modification)]

Various post-treatments may be conducted to modify the optically anisotropic layer produced. Examples of the post treatments include corona treatment for improving adhesiveness, addition of a plasticizer for improving plasticity, addition of a thermal polymerization inhibitor for improving storage stability, and coupling treatment for improving reactivity. When the polymer in the optically anisotropic layer has an unreacted reactive group, addition of a polymerization initiator suited to the reactive group may also be a useful modification means. For example, by addition of a radical photopolymerization initiator to an optically anisotropic layer fixed by polymerization of a liquid crystalline compound having a cationically reactive group and a radically reactive group by using a cationic photopolymerization initiator, the reaction of the unreacted radically reactive group in the patterned light-exposure afterward can be promoted. As the means of addition of the plasticizer or the photopolymerization initiator, examples include contacting an optically anisotropic layer to the solution containing the pertinent supplementary additive, or immersing an optically anisotropic layer in the solution containing the pertinent supplementary additive, and applying the solution containing the pertinent additive to the optically anisotropic layer for permeance of the solution. In the present specification, a supplementary additive means a plasticizer, thermal polymerization inhibitor, polymerization initiator, coupling treatment, and other compounds which are used for modifying the properties of the optically anisotropic layer produced. Further, when another functional layer is laminated on the optically anisotropic layer, a supplementary additive may be added to the coating liquid of the layer for permeance (diffusion, penetration) to the optically anisotropic layer. In the present invention, it is possible, by properly selecting the kind and the amount of the supplementary additive used for immersion, in particular of the photopolymerization initiator, to adjust the relationship between the exposure quantity to respective regions during patterned light exposure of the patterned birefringent material and the peak wavelength and peak reflectance of the characteristic reflection finally obtained and thus make the final product have material properties closer to desirable values.

[Birefringent Pattern Building Material]

The birefringent pattern building material is a material for producing a birefringent pattern, and a material from which birefringent pattern can be obtained by proceeding predetermined steps. The birefringent pattern building material may generally be in a shape of film or sheet. The birefringent pattern building material may include a functional layer which can impart various accessory (secondary) functions, other than the optically anisotropic layer. Examples of the functional layer include a support, an alignment layer, a reflective layer, a post-adhesive layer, and a light absorbing layer. Further, the birefringent pattern building material used as a transferring material or the birefringent pattern building material produced by using a transferring material may include a temporary support, an adhesive layer for transfer, or a dynamic property controlling layer.

[Support]

The birefringent pattern building material may include a support for the purpose of maintaining the dynamic stability. The support used for the birefringent pattern building material is not particularly limited, and it may be rigid or flexible. As a rigid support, examples include, although not particularly limited to, known glasses such as soda glass sheet having a silicon oxide film formed on the surface thereof, low-expansion glass, non-alkali glass, and silica glass sheet, metal plates such as aluminum plate, iron plate, and SUS plate, resin plate, ceramic plate, and stone plate. As a flexible support, examples include, although not particularly limited to, plastic films such as cellulose ester (for example, cellulose acetate, cellulose propionate, and cellulose butyrate), polyolefin (for example, norbornene based polymer), poly(meth)acrylate (for example, polymethylmethacrylate), polycarbonate, polyamide, polyester, and polysulfone, paper, aluminium foil, and fabric. In view of the convenience of handling, the thickness of the rigid support is preferably 100 to 3,000 µm, and more preferably 300 to 1,500 µm. The thickness of the flexible support is preferably 3 to 500 µm, and more preferably 10 to 200 µm. The support is preferred to have heat-resistance sufficient for preventing coloring or deformation in the after-mentioned baking step.

[Alignment Layer]

An alignment layer may be used for forming the optically anisotropic layer. The alignment layer may be generally formed on the surface of a support or a temporary support, or on the surface of an undercoating layer formed on the support or a temporary support. The alignment layer has function of controlling the alignment of rod-like liquid crystalline compounds thereon. In the cholesteric liquid crystal phase, the presence of alignment layer is not essential. However, the in-plane alignment direction is uniformed by the presence of alignment layer thereby suppressing formation of micro regions (domains) each of which has a different alignment direction. As a result, an optically anisotropic layer with less haze is obtained. The alignment layer may be any type of layer, as long as the layer can impart alignment with the optically anisotropic layer. Preferable examples of the alignment layer include a layer in which an organic compound (preferably a polymer) is subjected to rubbing treatment, obliquely-deposited layer of an inorganic compound, a layer with microgrooves, or built-up film of organic compounds (for example, omega-tricosanoic acid, dioctadecylmethylammonium chloride, and methyl stearate) by the Langmuir-Blodgett (LB) film method. Further, alignment layers in which a dielectric material is aligned by adding an electric or magnetic field are also exemplified.

Examples of the organic compound, which can be used for forming the alignment layer, include polymers such as polymethylmethacrylate, acrylic acid/methacrylic acid copolymer, styrene/maleimide copolymer, polyvinyl alcohol, poly (N-methylol acrylamide), polyvinylpyrrolidone, styrene/vinyl toluene copolymer, chlorosulfonated polyethylene, nitrocellulose, polyvinyl chloride, chlorinated polyolefin, polyester, polyimide, vinyl acetate/vinyl chloride copolymer, ethylene/vinyl acetate copolymer, carboxymethyl cellulose, polyethylene, polypropylene and polycarbonates; and silane coupling agents. Preferred examples of the polymer include polyimide, polystyrene, polymers of styrene derivatives, gelatin, polyvinyl alcohol and alkyl-modified polyvinyl alcohol having at least one alkyl group (preferably an alkyl group having carbon atoms of 6 or more).

For production of an alignment layer, a polymer may preferably be used. The kinds of the polymer, which is used for forming the alignment layer, may be decided depending on the alignment of liquid crystalline compound (in particular, the average tilt angle). For forming an alignment layer capable of aligning liquid crystalline compounds horizontally, a polymer (an ordinary polymer for alignment) which does not lower the surface energy of the alignment layer is used. Specifically, kinds of such a polymer are described in various documents concerning liquid crystal cells or optical compensation sheets. Polyvinyl alcohols, modified polyvinyl alcohols, polyacrylic acid, acrylic acid/acrylate copolymers, polyvinyl pyrrolidone, cellulose and modified cellulose are preferably used. Materials used for producing the alignment layer may have a functional group capable of reacting with the reactive group of the liquid crystalline compound in the optically anisotropic layer. Examples of the polymer having such a functional group include polymers having side chains comprising a repeating unit having such a reactive group, and polymers having a cyclic moiety substituted with such a reactive group. It is more preferable to use an alignment layer capable of forming a chemical bond with the liquid crystalline compound at the interface, and a particularly preferable example of such alignment layer is a modified polyvinyl alcohol, described in JP-A-9-152509, which has an acrylic group introduced in the side chain thereof using acid chloride or Karenz MOI (trade name, manufactured by Showa Denko K. K.). The thickness of the alignment layer is preferably 0.01 to 5 µm, and more preferably 0.05 to 2 µm. The alignment layer may functions as an oxygen insulation layer.

Polyimide film (preferably a film composed of a fluorine-atom containing polyimide) which has been widely used as an alignment layer for liquid crystal display (LCD) is also preferable as an organic alignment layer. The film may be obtained by applying polyamic acid (available as, for example, LQ/LX series products by Hitachi Chemical Co., Ltd or SE series products by NISSAN CHEMICAL INDUSTRIES, LTD), to a surface of the support, followed by baking it at 100° C. to 300° C. for 0.5 to one hour to form a polymer layer, and then rubbing the surface of the polymer layer.

The rubbing treatment may be carried out with known treating methods which have been employed as a treating process for liquid crystalline molecular aligning of LCD. In particular, the rubbing treatment may be carried out by rubbing a surface of a polymer layer in a direction with paper, gauze, felt, rubber, nylon or polyester fiber or the like. The rubbing treatment may generally be carried out by rubbing the surface of a polymer layer several times with a cloth where fibers having the same length and the same diameter are grafted uniformly.

Examples of a deposition material used in inorganic obliquely deposited film include metal oxides such as $SiO_2$, $TiO_2$ and $ZnO$ ($SiO_2$ is a typical material); fluorides such as $MgF_2$; metals such as Au and Al. Any high dielectric constant metal oxides can be used as an oblique deposition material, and thus, examples thereof are not limited to the above mentioned materials. The inorganic obliquely deposited film may be formed with a deposition apparatus. The inorganic obliquely deposited film may be formed by depositing with a film (a support) stabilized. Alternatively, the inorganic obliquely deposited film may be formed by depositing continuously while relocating a long film.

[Support which Doubles an Alignment Layer]

In order to make the alignment layer work (function), a method of forming an alignment layer onto the support and subjecting the surface of the alignment layer to a rubbing treatment is common. However, depending on the combination of a coating liquid and a support, it is also possible to align the liquid crystal layer by directly rubbing the support. Examples of such a support include a support having an organic compound, particularly a polymer preferably used for the alignment layer that is described below as its major component. Examples of such a support include PET film, polyamide film etc.

[Concave-Convex Alignment Layer]

As the alignment layer of the liquid crystal, a film with a microasperity (tiny concavity and convexity) can be used as well as a film to which rubbing or ionizing ray alignment is performed.

In a concave portion-forming region, a variety of structures may be used. For example, in the concave portion-forming region, a structure in which a plurality of grooves is arranged parallel to the width direction at regular intervals may be used.

These grooves may not be parallel to each other. However, the closer the grooves are to parallel, the easier the long axis of a liquid crystal molecule or a methogenic group thereof may be to be uniformed. The angle at which these grooves intersect with each other may be controlled, for example, at 5° or less, and typically at 3° or less.

These grooves may be arranged in a matrix in a plane. The length of the groove may be the same or different from each other. A distance between grooves lying next to each other in the longitudinal direction may be uniform or nonuniform. Further, a distance between grooves lying next to each other in the width direction may be uniform or nonuniform. In the concave portion-forming region, grooves having a length equal to each other may be arranged in a matrix in a plane. Alternatively, grooves having varied lengths may be arranged randomly.

These grooves can constitute a diffraction lattice by arranging the grooves almost parallel to each other and setting properly a value of pitch of the groove.

The concave portion-forming layer (concave-convex alignment layer) may be formed, for example, by a method of recording a hologram pattern on a photosensitive resin material using dual beam interferometry, or a method of drawing a pattern on a photosensitive resin material using electron beam. Alternatively, as currently carried out in production of surface relief type hologram, the concave portion-forming layer may be formed by pressing a mold provided with a fine linear convex portion to a resin. For example, the concave portion-forming layer may be obtained by pressing, while heating, an original plate provided with a linear convex portion to a thermoplastic resin layer formed on a substrate, namely by hot embossing. Alternatively, it is also possible to obtain the concave portion-forming layer by coating an ultraviolet ray-curable resin on a substrate, and then curing the ultraviolet ray-curable resin upon exposure to ultraviolet ray from a side of the support while pressing the original plate to the ultraviolet ray-curable resin layer on the substrate, and then removing the original plate.

According to these methods, it is possible to form a plurality of concave portion-forming regions each of which has a different longitudinal direction from each other in one plane. Further, these methods also make it possible to form a plurality of concave portion-forming regions each of which has a different depth, width, length, pitch and the like of the groove from each other, in one plane.

The above-described original plate may be obtained, for example, by a method of recording a hologram pattern using dual beam interferometry, a method of drawing a pattern using electron beam, or electrocasting a mother die obtained by a method of cutting with a bite. When the concave portion-forming region is not provided intentionally with the above-described diversity, the groove may be formed by a rubbing processing.

The depth of the groove may be set, for example, in the range of 0.05 µm to 1 µm. The length of the groove may be set, for example, in the range of 0.5 µm or more. The pitch of the groove may be, for example, 0.1 µm or more and typically 0.75 µm or more. The pitch of the groove may be, for example, 10 µm or less and typically 2 µm or less. In order to align the liquid crystal molecule or a methogenic group thereof with a high degree of order, a small pitch of the groove is advantageous.

[Reflective Layer]

The birefringent pattern building material may have a reflective layer. As the reflective layer, examples include, but not to be limited to, a metal layer such as an aluminum layer or a silver layer.

[Post-Adhesive Layer]

The birefringent pattern building material may include a post-adhesive layer in order that the patterned birefringent product produced after the after-mentioned patterned light exposure and baking can be attached to another product. The material of the post-adhesive layer is not particularly limited, but preferred to be a material which has adhesiveness even after the baking step for production of the birefringent pattern.

[Light Absorbing Layer]

The birefringent pattern building material may have a light absorbing layer at the non-visible side (the side of a support) rather than the optically anisotropic layer so that a characteristic reflection light arising from the optically anisotropic layer can be more easily identified. The light absorbing layer is not particularly limited. Examples of the light absorbing layer include an acrylic polymer layer in which carbon black is dispersed.

[Two or More Optically Anisotropic Layers]

The birefringent pattern building material of the present invention may include two or more optically anisotropic layers. The two or more optically anisotropic layers may be adjacent to each other in direction of the normal line, or may sandwich another functional layer. In these embodiments, it is necessary that at least one of the two or more optically anisotropic layers has a cholesteric structure. On the other hand, the other layer(s) may or may not have a cholesteric structure. When the birefringent pattern building material has two or more optically anisotropic layers each of which has a cholesteric structure, these optically anisotropic layers may be the same or different from each other in terms of cholesteric pitch, peak wavelength of characteristic reflection, peak reflectance, or characteristic reflection-disappearance temperature.

[Method of Producing Birefringent Pattern Building Material]

In the present invention, the production of the birefringent pattern building material is performed by preparing at least one optically anisotropic layer containing a polymer material that is contained therein by a process including: forming a cholesteric liquid crystal phase by coating and drying a composition (coating liquid) containing the rod-like liquid crystalline compound having at least two reactive groups and the chiral agent each of which is described above; and then subjecting the cholesteric liquid crystal phase to heating or exposure to radiation thereby containing a polymer fixed by polymerization and fixing. The optically anisotropic layer may be formed by coating the composition directly on a support or above the support through another layer applied onto the support. The coating method is the same as those that can be used for coating each layer of the transferring material described below. As a suitable drying condition, although varies depending on the rod-like liquid crystalline compound to be used, coating liquid solvent to be used, or the like, the drying is preferably performed at a film surface temperature of 40° C. to 140° C. for a period of 5 seconds to 180 seconds.

Alternatively, a birefringent pattern building material may be formed by transferring the optically anisotropic layer that has been previously formed in the transferring material. Hereinafter, a transferring material for transferring the optically anisotropic layer is described. Such transferring material is referred to as "a transferring material for producing a birefringent pattern" in the below-described Examples or the like.

The transferring material preferably includes at least [A] an optically anisotropic layer and [B] a transferring adhesive layer laminated on a temporary support in this order. A formation of the optically anisotropic layer in the transferring material may be performed by coating and drying the similar composition (coating liquid) as described above; followed by polymerization and fixing due to heating or exposure to radiation.

[Temporary Support]

The birefringent pattern building material used as a transferring material is preferred to include a temporary support. The temporary support is not particularly limited and may be transparent or opaque. Examples of the polymer, which can constitute a temporary support, include cellulose ester (for example, cellulose acetate, cellulose propionate, and cellulose butyrate), polyolefin (for example, norbornene based polymer), poly(meth)acrylate (for example, polymethylmethacrylate), polycarbonate, polyester, and polysulfone. For the purpose of examining optical property in a manufacturing process, the support is preferably transparent and low-birefringent polymer. From the view point of low-birefringence, the support is preferably selected from cellulose ester films and norbornene based polymer films. Commercially available norbornene based polymers such as "ARTON" (trade name, produced by JSR Corporation), "ZEONEX" and "ZEONOR" (trade names, produced by ZEON CORPORATION) may be used. Further, polycarbonate, polyethylene terephthalate, or the like which is inexpensive, may also be preferably used.

[Adhesive Layer for Transfer]

The transferring material is preferred to have an adhesive layer for transfer. The adhesive layer for transfer is not particularly limited as far as the layer is transparent and non-colored, and has sufficient property for transfer. Examples thereof include adhesive layer using an adhesive agent, a pressure-sensitive resin layer, a heat-sensitive resin layer, and a photosensitive resin layer. Among these, the photosensitive resin layer and the heat-sensitive resin layer are preferred in view of baking-resistance (heat-resistance) required for application to a substrate for liquid crystal display device and the like.

The adhesive agent is preferred to exhibit, for example, good optical transparency, suitable wettability, and adhesive characteristics such as cohesiveness and adhesiveness. Specific examples include adhesive agents where a polymer such as an acrylic polymer, silicone based polymer, polyester, polyurethane, polyether, or synthetic rubber is prepared suitably as a base polymer. The adhesive characteristics of the adhesive layer can be suitably controlled by conventionally known methods. These methods include adjusting the composition and/or molecular weight of the base polymer forming the adhesive layer, and adjusting the degree of crosslinking and/or the molecular weight thereof by means of the crosslinking method, the content of crosslinking functional groups, and the blending ratio of the crosslinking agent.

The pressure-sensitive resin layer is not specifically limited as far as it exhibits adhesiveness when pressure is applied. Various adhesives, such as rubber adhesives, acrylic adhesives, vinyl ether series adhesives, and silicone series adhesives, can be employed in the pressure-sensitive adhesive. The adhesives may be employed in the manufacturing and coating stages in the form of solvent-based adhesives, non-water-based emulsion adhesives, water-based emulsion adhesives, water-soluble adhesives, hot melt adhesives, liquid hardening adhesives, delayed tack adhesives, and the like. Rubber adhesives are described in the New Polymer Library 13, "Adhesion Techniques," Kobunshi Kankokai (K. K.), p. 41 (1987). Examples of the vinyl ether series adhesives include those comprising polymers of alkyl vinyl ether compounds having 2 to 4 carbon atoms as the base resin, and vinyl chloride/vinyl acetate copolymers, vinyl acetate polymers, polyvinyl butyrals, and the like, to which a plasticizer is admixed. With respect to the silicone series adhesives, rubber-like siloxane is used to impart film formation and condensation strength of the film, and resinous siloxane is used to impart tackiness or adhesiveness.

The heat-sensitive resin layer is not specifically limited as far as it exhibits adhesiveness when heat is applied. Examples of the heat-sensitive adhesives include hot-melt compounds and thermoplastic resins. Examples of the hot-melt compounds include low molecular weight compounds of thermoplastic resins such as polystyrene resin, acrylic resin, styrene-acrylic resin, polyester resin, and polyurethane resin; and various waxes including vegetable waxes such as carnauba wax, Japan wax, candelilla wax, rice wax, and auricury wax; animal waxes such as beeswax, insect waxes, shellac, and whale wax; petroleum waxes such as paraffin wax, microcrystalline wax, polyethylene wax, Fischer-Tropsch wax, ester wax, and oxidized waxes; and mineral waxes such as montan wax, ozokerite, and ceresin wax. Further examples include rosin derivatives such as rosin, hydrogenated rosin, polymerized rosin, rosin-modified glycerin, rosin-modified maleic acid resin, rosin-modified polyester resin, rosin-modified phenol resin, ester rubber; as well as phenol resin, terpene resin, ketone resin, cyclopentadiene resin, aromatic hydrocarbon resin, aliphatic hydrocarbon resin, and alicyclic hydrocarbon resin.

These hot-melt compounds preferably have a molecular weight of, usually 10,000 or less, particularly 5,000 or less, and a melting or softening point desirably falling within the range of 50° C. to 150° C. These hot-melt compounds may be used singly or in combinations of two or more. Examples of the above-mentioned thermoplastic resin include ethylene series copolymers, polyamide resins, polyester resins, polyurethane resins, polyolefin series resins, acrylic resins, and cellulose series resins. Among these, the ethylene series copolymers are particularly preferably used.

The photosensitive resin layer may be formed of a photosensitive polymer composition. The photosensitive resin layer is not specifically limited, and either of positive type and negative type is acceptable. In addition, commercially available resist material may also be used. When used as an adhesive layer for transfer, adhesiveness is preferably exhibited by light irradiation. To cope with environmental problems or explosion-preventing in the process of manufacturing products such as substrates for liquid crystal display devices, the photosensitive resin layer is preferably developed with an aqueous developing solution containing organic solvents in an amount of 5% or less, particularly preferably with an alkali developing solution. The photosensitive resin layer is preferably formed of a resin composition comprising at least (1) a polymer, (2) a monomer or oligomer, and (3) a photopolymerization initiator or photopolymerization initiator system.

Hereinafter, these components (1) to (3) will be explained below.

(1) Polymer

The polymer (hereinafter also simply referred to as "binder") is preferably an alkali-soluble resin comprising a polymer having a polar group such as a carboxylic acid group or a carboxylate salt group at its side chain. Examples of the resin include a methacrylic acid copolymer, an acrylic acid copolymer, an itaconic acid copolymer, a crotonic acid copolymer, a maleic acid copolymer, and a partially esterified maleic acid copolymer described in, for example, JP-A-59-44615, JP-B-54-34327 ("JP-B" means examined Japanese patent publication), JP-B-58-12577, JP-B-54-25957, JP-A-59-53836, and JP-A-59-71048. The examples further include a cellulose derivative having a carboxylic acid group at its side chain. In addition to the foregoing, a product obtained by adding a cyclic acid anhydride to a polymer having a hydroxyl group can also be preferably used. In addition, particularly preferable examples of the resin include a copolymer of benzyl(meth)acrylate and (meth)acrylic acid and a multicomponent copolymer of benzyl(meth)acrylate, (meth)acrylic acid, and other monomer described in U.S. Pat. No. 4,139,391. Each of these binder polymers each having a polar group may be used alone, or may be used in combination with an ordinary film formable polymer so that they are used in a state of a composition. The polymer is added in an amount of generally 20 mass % to 70 mass %, preferably 25 mass % to 65 mass %, and more preferably 25 mass % to 45 mass % with respect to the total solid content.

(2) Monomer or Oligomer

The monomer or oligomer used in the photosensitive resin layer is preferably a monomer or oligomer which has two or more ethylenically unsaturated double bonds and which undergoes addition-polymerization by exposure to light. Examples of such monomer or oligomer include a compound having at least one addition-polymerizable ethylenically unsaturated group in the molecule and having a boiling point of 100° C. or higher at normal pressure. Examples thereof include: a monofunctional acrylate and a monofunctional methacrylate such as polyethylene glycol mono(meth)acrylate, polypropylene glycol mono(meth)acrylate, and phenoxyethyl(meth)acrylate; a polyfunctional acrylate and a polyfunctional methacrylate such as polyethylene glycol di(meth)acrylate, polypropylene glycol di(meth)acrylate, trimethylolethane triacrylate, trimethylolpropane tri(meth)acrylate, trimethylolpropane diacrylate, neopentyl glycol di(meth)acrylate, pentaerythritol tetra(meth)acrylate, pentaerythritol tri(meth)acrylate, dipentaerythritol hexa(meth)acrylate, dipentaerythritol penta(meth)acrylate, hexanediol di(meth)acrylate, trimethylolpropane tri(acryloyloxypropyl) ether, tri(acryloyloxyethyl)isocyanurate, tri(acryloyloxyethyl)cyanurate, glycerin tri(meth)acrylate; a (meth)acrylated compound which is obtained by adding ethylene oxide or propylene oxide to a polyfunctional alcohol such as trimethylolpropane or glycerin and converting the adduct into a (meth)acrylate.

Examples of the monomer and the oligomer further include urethane acrylates as described in JP-B-48-41708, JP-B-50-6034, and JP-A-51-37193; polyester acrylates as described in JP-A-48-64183, JP-B-49-43191, and JP-B-52-30490; and polyfunctional acrylates or polyfunctional methacrylates such as an epoxy acrylate which is a reaction product of an epoxy resin and (meth)acrylic acid.

Among these, trimethylolpropane tri(meth)acrylate, pentaerythritol tetra(meth)acrylate, dipentaerythritol hexa(meth)acrylate, and dipentaerythritol penta(meth)acrylate are preferable.

In addition, "polymerizable compound B" described in JP-A-11-133600 can be mentioned as a preferable example.

These monomers or oligomers may be used singly or as a mixture of two or more kinds thereof. The content of the monomer or the oligomer is generally in a range of 5 mass % to 50 mass %, preferably 10 mass % to 40 mass %, based on the total solid content in the photosensitive resin composition.

(3) Photopolymerization Initiator or Photopolymerization Initiator System

Examples of the photopolymerization initiator or the photopolymerization initiator system (in the present specification, the term "photopolymerization initiator system" means a polymerization initiating mixture that exhibits a function of photopolymerization initiation with a plurality of compounds combined with each other) include vicinal polyketaldonyl compounds disclosed in U.S. Pat. No. 2,367,660, acyloin ether compounds described in U.S. Pat. No. 2,448,828, aromatic acyloin compounds substituted by an α-hydrocarbon described in U.S. Pat. No. 2,722,512, polynuclear quinone compounds described in U.S. Pat. No. 3,046,127 and U.S. Pat. No. 2,951,758, combinations of triarylimidazole dimer and p-aminoketone described in U.S. Pat. No. 3,549,367, benzothiazole compounds and trihalomethyl-s-triazine compounds described in JP-B-51-48516, trihalomethyl-triazine compounds described in U.S. Pat. No. 4,239,850, and trihalomethyloxadiazole compounds described in U.S. Pat. No. 4,212,976. In particular, trihalomethyl-s-triazine, trihalomethyloxadiazole, and triarylimidazole dimer are preferable.

In addition, "polymerization initiator C" described in JP-A-11-133600 can also be mentioned as a preferable example.

These photopolymerization initiators and photopolymerization initiator systems each may be used singly. Alternatively, a mixture of two or more selected from these photopolymerizable initiators and photopolymerization initiator systems may be used. In particular, it is preferable to use two or more selected from the photopolymerizable initiators and photopolymerization initiator systems. When two or more selected from the photopolymerizable initiators and photopolymerization initiator systems are used, the display properties, particularly evenness of display, can be improved.

As to the content of the photopolymerization initiators and the photopolymerization initiator systems, the content is generally in the range of 0.5 to 20 mass %, preferably 1 to 15 mass %, based on the total solid content in the photosensitive resin composition.

The photosensitive resin layer preferably contains an appropriate surfactant, from the viewpoint of effectively preventing unevenness. Any surfactants are applicable so far as they are miscible with the photosensitive resin composition. Surfactants preferably applicable to the present invention include those disclosed in paragraphs [0090] to [0091] in JP-A-2003-337424, paragraphs [0092] to [0093] in JP-A-2003-177522, paragraphs [0094] to [0095] in JP-A-2003-177523, paragraphs [0096] to [0097] in JP-A-2003-177521, paragraphs [0098] to [0099] in JP-A-2003-177519, paragraphs [0100] to [0101] in JP-A-2003-177520, paragraphs [0102] to [0103] in JP-A-11-133600 and those disclosed as the invention in JP-A-6-16684. In order to obtain higher effects, it is preferable to use any of fluorine-containing surfactants and/or silicone based surfactants (fluorine-containing surfactant, or, silicone based surfactant, and surfactant containing both of fluorine atom and silicon atom), or two or more surfactants selected therefrom, wherein the fluorine-containing surfactant is most preferable. When the fluorine-containing surfactant is used, the number of fluorine atoms contained in the fluorine-containing substituents in one surfactant molecule is preferably 1 to 38, more preferably 5 to 25, and most preferably 7 to 20. Too large number of fluorine atoms degrades the solubility in general fluorine-free solvents and thus is undesirable. Too small number of fluorine atoms does not provide effects of improving the unevenness and thus is undesirable.

Particularly preferable surfactants can be those containing a copolymer which includes the monomers represented by formula (a) and (b) below, having the mass ratio of formula (a)/formula (b) of 20/80 to 60/40.

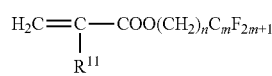

Formula (a)

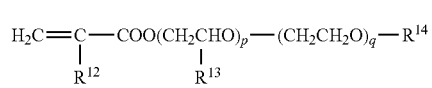

Formula (b)

In formulae, $R^{11}$, $R^{12}$ and $R^{13}$ independently represent a hydrogen atom or a methyl group, $R^{14}$ represents a hydrogen atom or an alkyl group having 1 to 5 carbon atoms. n represents an integer of 1 to 18, and m represents an integer of 2 to 14. p and q represents integers from 0 to 18, excluding the case where both of p and q are 0.

It is to be defined now that a monomer represented by formula (a) and a monomer represented by formula (b) of the particularly preferable surfactants are denoted as monomer (a) and monomer (b), respectively. $C_mF_{2m+1}$ in formula (a) may be straight-chained or branched. m represents an integer of 2 to 14, and is preferably an integer of 4 to 12. Content of $C_mF_{2m+1}$ is preferably 20 to 70% by mass, and more preferably 40 to 60% by mass, of monomer (a). $R^{11}$ represents a hydrogen atom or a methyl group. n represents 1 to 18, and more preferably 2 to 10. $R^{12}$ and $R^{13}$ in formula (b) independently represent a hydrogen atom or a methyl group, and $R^{14}$ represents a hydrogen atom or an alkyl group having 1 to 5 carbon atoms. p and q respectively represent integers of 0 to 18, excluding the case where both of p and q are 0. p and q are preferably 2 to 8.

The monomer (a) contained in one particularly preferable surfactant molecule may be those having the same structure, or having structures differing within the above-defined range. The same can also be applied to the monomer (b).

The mass-average molecular weight Mw of a particularly preferable surfactant preferably falls in the range from 1,000 to 40,000, and more preferably from 5,000 to 20,000. The surfactant characteristically contains a copolymer composed of the monomers expressed by formula (a) and formula (b), and having the mass ratio of monomer (a)/monomer (b) of 20/80 to 60/40. Hundred parts by mass of a particularly preferable surfactant is preferably composed of 20 to 60 parts by mass of monomer (a), 80 to 40 parts by mass of monomer (b), and residual parts by mass of other arbitrary monomers, and more preferably 25 to 60 parts by mass of monomer (a), 60 to 40 parts by mass of monomer (b), and residual parts by mass of other arbitrary monomer.

Copolymerizable monomers other than monomers (a) and (b) include styrene and derivatives or substituted compounds thereof including styrene, vinyltoluene, α-methylstyrene, 2-methylstyrene, chlorostyrene, vinyl benzoate, sodium vinylbenzene sulfonate, and aminostyrene; dienes such as butadiene and isoprene; and vinylic monomers such as acrylonitrile, vinylethers, methacrylic acid, acrylic acid, itaconic acid, crotonic acid, maleic acid, partially esterified maleic acid, styrene sulfonic acid, maleic anhydride, cinnamic acid, vinyl chloride and vinyl acetate.

A particularly preferable surfactant is a copolymer of monomer (a), monomer (b) and so forth, allowing monomer sequence of random or ordered, such as forming a block or graft, while being not specifically limited. A particularly preferable surfactant can incorporate two or more monomers differing in the molecular structure and/or monomer composition in a mixed manner.

The content of the surfactant is preferably in the range of 0.01 to 10% by mass to the total amount of solid content of the photosensitive resin layer, and more preferably in the range of 0.1 to 7% by mass. The surfactant contains a surfactant having a specific structure, predetermined amounts of ethylene oxide group and propylene oxide group. Therefore, addition of the surfactant in a specific range to the photosensitive resin layer enables to improve unevenness in the display on the liquid crystal display device provided with the photosensitive resin layer. When the content is too small to the total solid content, the unevenness in the display is not reduced. When the content is too large, the effect of reducing the unevenness in the display cannot be obtained. Production of the color filter while adding the above particularly preferable surfactant described to the photosensitive resin layer is preferable in terms of improving the unevenness in the display.

Specific examples of preferable fluorine base surfactant include the compounds described in paragraphs [0054] to [0063] in JP-A-2004-163610. The commercial surfactants listed below may also be used directly. As applicable commercially-available surfactants, examples include fluorine-containing surfactants such as Eftop EF301, EF303 (trade names, produced by Shin-Akita Kasei K. K.), Florad FC430, 431 (trade names, produced by Sumitomo 3M Limited), Megafac F171, F173, F176, F189, R08 (trade names, produced by Dainippon Ink and Chemicals, Inc.), Surflon S-382, SC101, 102, 103, 104, 105, 106 (trade names, produced by ASAHI GLASS CO., LTD.), and silicone based surfactants. Also polysiloxane polymer KP-341 (trade name, produced by Shin-Etsu Chemical Co., Ltd.) and Troysol S-366 (trade name, produced by Troy Chemical Industries, Inc.) may be used as the silicone based surfactants. The compounds disclosed in paragraphs [0046] to [0052] in JP-A-2004-331812, which are fluorine-containing surfactants not containing the monomer represented by formula (a) also preferably used.

[Dynamic Property Controlling Layer]

Between the temporary support and the optically anisotropic layer of the transferring material, a dynamic property controlling layer to control dynamic property (mechanical characteristics) and conformity to irregularity (unevenness) may be preferably provided. The dynamic property controlling layer preferably exhibit flexible elasticity, is softened by heat, or fluidized by heat. A thermoplastic resin layer is particularly preferred for the dynamic property controlling layer. The component used in the thermoplastic resin layer is preferably an organic polymer substance described in JP-A-5-72724. The substance can be particularly preferably selected from organic polymer substances having a softening point of about 80° C. or lower according to the Vicat method (specifically, the method of measuring softening point of polymers according to American Material Test Method ASTM D 1235). More specifically, examples include: a polyolefin such as polyethylene or polypropylene; an ethylene copolymer such as a copolymer of ethylene and vinyl acetate or a saponified product thereof; a copolymer of ethylene and acrylic acid ester or a saponified product thereof; polyvinyl chloride; a vinyl chloride copolymer such as a copolymer of vinyl chloride and vinyl acetate or a saponified product thereof; polyvinylidene chloride; a vinylidene chloride copolymer; polystyrene; a styrene copolymer such as a copolymer of styrene and (meth)acrylic acid ester or a saponified product thereof; polyvinyl toluene; a vinyltoluene copolymer such as a copolymer of vinyltoluene and (meth)acrylic acid ester or a saponified product thereof; poly(meth)acrylic acid ester; a (meth)acrylic acid ester copolymer such as a copolymer of butyl(meth)acrylate and vinyl acetate; and a polyamide resin such as a vinyl acetate copolymer nylon, a copolymerized nylon, N-alkoxymethylated nylon, and N-dimethylaminated nylon.

[Delamination Layer]

The birefringent pattern building material used as a transferring material may include a delamination layer on the temporary support. The delamination layer controls the adhesion between the temporary support and the delamination layer or between the delamination layer and the layer laminated immediately above, and takes a role of helping the delamination (peeling off) of the temporary support after the transfer of the optically anisotropic layer. The above-mentioned other functional layers such as the alignment layer and the dynamic property controlling layer may function as the delamination layer.

The transferring material preferably has an intermediate layer for the purpose of preventing mixing of the components during coating of a plurality of layers and during storage after the coating. The oxygen shut-off film having an oxygen shut-off function described as "separation layer" in JP-A No. 5-72724 or the above-described alignment layer for forming optical anisotropy is preferably used as the intermediate layer. Particularly preferably among them is a layer containing a mixture of polyvinylalcohol or polyvinylpyrrolidone and one or more derivatives thereof. The delamination layer may work simultaneously as the above thermoplastic resin layer, oxygen shut-off layer, and alignment layer.

[Surface Protecting Layer]

A thin surface protecting layer is preferably provided on the resin layer for protecting the above layers against contamination or damage during storage. The property of the surface protecting layer is not particularly limited and the surface protecting layer may be formed of the same or a similar material to that of the temporary support. The surface protecting layer should be readily separated from the layer adjacent thereto (for example, an adhesive layer for transfer). As the material for the surface protecting layer, silicone paper, polyolefin or polytetrafluoroethylene sheet is suitable.

The individual layers of the optically anisotropic layer, photosensitive resin layer, adhesive layer for transfer, and optionally-formed alignment layer, thermoplastic resin layer, dynamic property controlling layer, and intermediate layer can be formed by coating such as dip coating, air knife coating, spin coating, slit coating, curtain coating, roller coating, wire bar coating, gravure coating and extrusion coating (U.S. Pat. No. 2,681,294). Two or more layers may be coated simultaneously. Methods of simultaneous coating is described in U.S. Pat. Nos. 2,761,791, 2,941,898, 3,508,947, 3,526,528, and in "Kotingu Kogaku (Coating Engineering), written by Yuji Harazaki, p. 253, published by Asakura Shoten (1973).

When the layer on the optically anisotropic layer (for example, the adhesive layer for transfer) is applied to the optically anisotropic layer, the coating liquid may be added with a plasticizer or a photopolymerization initiator. Thereby, the modification of the layer may be conducted simultaneously by immersion of these additives.

[Method of Transferring Material to Target Transfer Material]

Methods of transferring the transferring material on a target transfer material are not specifically limited, so far as the optically anisotropic layer can be transferred to the target transfer material such as a support (substrate). For example, the transferring material in a film form may be attached to the substrate by a laminator so that the surface of the adhesive layer for transfer is faced to the surface of the target transfer material, then pressing with rollers or flat plates which are pressed, or pressing under heating with rollers or flat plates which are heated and pressed. Specific examples of the laminator and the method of lamination include those described in JP-A-7-110575, JP-A-11-77942, JP-A-2000-334836 and JP-A-2002-148794, wherein the method described in JP-A-7-110575 is preferable in terms of low contamination.

Examples of the target transfer material include a support, a laminated structure which contains a support and other functional layers, and a (multilayer) birefringent pattern building material.

[Steps Included in Transfer]

The temporary support may be delaminated or not be delaminated after transferring of the birefringent pattern building material to the target transfer material. When the temporary support is not delaminated, the temporary support preferably has transparency suited for the patterned light exposure afterwards and heat-resistance sufficient for surviving the baking step. A step for removing unwanted layers which has been transferred with the optically anisotropic layer may be included in the method. For example, when polyvinyl alcohol/polyvinylpyrrolidone copolymer is used in the alignment layer, the alignment layer and the layers thereabove can be removed by development with an aqueous weak alkaline developing solution. Methods of the development may be any of known methods such as paddle development, shower development, shower-and-spin development and dipping development. The temperature of the developing solution is preferably 20° C. to 40° C., and pH of the developing solution is preferably 8 to 13.

Other layer may be formed on the surface remained after the delamination of the temporary support or the removal of the unwanted layers, according to need. Another transferring material may be transferred to the surface remained after the delamination of the temporary layer or the removal of the unwanted layers, according to need. The transferring material may be the same or different from the previously transferred transferring material. Further, the aligned state of the optically anisotropic layer in the first transferred transferring material may be the same as or different from the aligned state of the optically anisotropic layer in the second transferred transferring material. Transferring plural optically anisotropic layers is useful for production of a specific birefringent pattern (for example, a pattern having a variety of reflection colors).

[Production of Patterned Birefringent Product]

A patterned birefringent product can be produced by preparing the birefringent pattern building material in the same manner as described above (step [1]), and thereafter performing at least the following steps [2] and [3] in this order.

[2] subjecting the birefringent pattern building material to patterned a patterned exposure to light; and,

[3] baking a laminated structure obtained after the step [2] at 50° C. or higher and 400° C. or lower.

This method is a method of producing a patterned birefringent product in which a partial or entire region of the birefringent pattern building material is subjected to a patterned light exposure to cure the exposed region and enhance heat resistance, and then heating (baking) is performed so as to reduce birefringence in accordance with the existence and nonexistence of an exposure amount, or the small and large of an exposure amount of each region (the less exposure amount of the region, the larger range of reduction) thereby causing a difference in birefringence between regions.

[Patterned Light Exposure]

In the present specification, the pattern light exposure (patterned exposure to light, pattern exposure) means exposure in which only partial region of the birefringent pattern building material is exposed. The method of patterned light exposure may be a contact light exposure using a mask, proximity light exposure, projected light exposure, or direct drawing by focusing on the predetermined point by using laser or electron beam without a mask.

The irradiation wavelength of the light source for the light exposure preferably has a peak in the range of 250 to 450 nm, and more preferably in the range of 300 to 410 nm. Specific examples of the light source include extra-high voltage mercury lamp, high voltage mercury lamp, metal halide lamp, and blue laser. Exposure amount generally falls in the range preferably from about 3 mJ/cm$^2$ to about 2,000 mJ/cm$^2$, more preferably from about 5 mJ/cm$^2$ to about 1,000 mJ/cm$^2$, and further preferably from about 10 mJ/cm$^2$ to about 500 mJ/cm$^2$.

[Exposure Condition for Patterned Light Exposure]

In the production method according to the present invention, exposure operations (patterned light exposure) different in exposure condition from each other may be performed in two or more regions of a birefringent pattern building material. By performing the exposure operations different from each other in exposure condition in the two or more regions, it is possible to create a minute difference in birefringence of each region with respect to the finally obtained pattern. Herein, the "two or more regions" may or may not have mutually overlapping regions, but preferably have no mutually overlapping region. The patterned light exposure may be performed by a plurality of exposures, or by single exposure by using, for example, a mask having two or more regions having transmission spectra different from each other, or alternatively by exposure in combination thereof.

Examples of the parameters of the exposure conditions include, but are not particularly limited thereto, exposure peak wavelength, exposure illuminance, exposure time period, exposure amount, exposure temperature, exposure atmosphere, and the like. Among them, exposure peak wavelength, exposure illuminance, exposure time period, and exposure amount are preferable, and exposure illuminance, exposure time period, and exposure amount are more preferable, from the viewpoint of convenience in adjusting the conditions. Regions exposed under different exposure conditions upon patterned light exposure have, after baking, different birefringence, in particular different characteristic reflections, that are controlled by the exposure conditions. It is thus possible to produce birefringent patterns having desired characteristic reflections which are different from each other between the regions after baking, by adjusting the exposure condition at the respective region upon patterned light exposure. The exposure condition for the two or more exposure regions exposed under different exposure conditions may be changed discontinuously or continuously.

[Mask Exposure]

Exposure by using an exposure mask is useful as a means for forming exposure regions different in exposure conditions. For example, it is possible to change readily the exposure conditions between the region subjected to the first time exposure and the region subjected to the second time exposure, by exposing first only one region by using an exposure mask, and then exposing second the other region or the entire surface by using another mask, while the temperature, atmosphere, exposure illuminance, exposure time period, or exposure wavelength is changed from that in the first time exposure. A mask having two or more regions respectively showing different transmission spectra is particularly useful as the mask for modifying the exposure illuminance or the exposure wavelength. In this case, multiple regions may be exposed to light under conditions different in exposure illuminance or exposure wavelength from each other, only by a single exposure operation. It is of course possible to obtain different exposure amounts by subjecting to exposure for the same time period under different exposure illuminance.

If scanning exposure such as a laser is used, it is possible to change the exposure conditions in the respective regions, for example, by changing the light source intensity or the scanning speed depending on the exposure regions.

Further, the method of the present invention may be combined with the steps, in which another transferring birefringent pattern building material is transferred to the laminated structure obtained by conducting patterned light exposure to a birefringent pattern building material, and then another patterned light exposure is conducted. The colors of characteristic reflection retained after baking can be effectively changed among the region which is a non-light-exposed region both in the first and second exposures (ordinarily, the region shows no characteristic reflection), the region which is a light-exposed region in the first exposure but a non-light-exposed region in the second exposure (ordinarily, the region shows a color of characteristic reflection arising from the first optically anisotropic layer), and the region which is a light-exposed region both in the first and second exposures (ordinarily, the region shows a mixed color of characteristic reflection arising from each optically anisotropic layer of the two layers). On the other hand, the region which is unexposed at the first time but is exposed at the second time is considered to be equal, upon the second time, to the region which is exposed at both the first and second times. In a similar manner, four or more regions can be readily formed, by conducting transfer and patterned light exposure alternately three, four or more times. The above-mentioned method is useful when the different regions desirably have various colors of reflection.

[Heating (Baking)]

Birefringent pattern can be produced by applying heat to the birefringent pattern building material after patterned light exposure at 50° C. or higher and 400° C. or lower, preferably at 80° C. or higher and 400° C. or lower.

In the present invention, the baking is preferably performed at a temperature equal to or higher than a characteristic reflection-disappearance temperature of the optically anisotropic layer in the unexposed portion. Such a baking makes it possible to significantly reduce a peak reflectance of the characteristic reflection in the unexposed portion whereby identifying between the exposed portion and the unexposed portion can be easily conducted.

[Post Treatment (Bleaching of Organic Dye)]

When an organic dye is used in the optically anisotropic layer, sometimes a color of the organic dye remains. The remaining color can be bleached by a post treatment as needed. For example, an excess amount of a boron compound is added in advance, and overall (whole area) exposure is conducted to generate radicals from the boron compound, and a dye is bleached as a result of decomposition of the dye by the radicals. It is more effective to carry out this method while heating. When the wavelength to be used for bleaching is close to the wavelength to be used for patterned light exposure, it is preferred to perform the post treatment after the baking.

[Finishing Heat Treatment]

When the birefringent pattern produced by the steps according to the preceding sections is desired to have a further-improved stability, a finishing heat treatment also may be performed for the purpose of further reacting unreacted reactive groups still remaining after the fixing to increase the durability, and for the purpose of evaporating or burning an unnecessary component in the material to remove such a component. The finishing heat treatment may be performed at a temperature from about 180° C. to about 300° C., more preferably from 190° C. to 260° C., and further preferably from 200° C. to 240° C. The time of the heat treatment is not particularly limited. However, the time of the heat treatment is preferably 1 minute or more and 5 hours or less, more preferably 3 minutes or more and 3 hours or less, and particularly preferably 5 minutes or more and 2 hours or less.

(Functional Layer to be Laminated on Birefringent Pattern)

Birefringent pattern building material can be subjected to exposure and baking as described in the above to obtain birefringent pattern, which can be then laminated with functional layers with various functions to thereby obtain a patterned birefringent product. Examples of the functional layer include, but not specifically limited to, hardcoat layer for preventing damage or scratches on the surface, and reflective layer which renders the birefringent pattern readily visible.

[Use of Patterned Birefringent Product]

The reflection that is shown by the patterned birefringent product is so unique that it is difficult to imitate the reflection by means of a pattern produced by electronic copying or printing. Besides, a method of producing the above-described cholesteric pattern is not yet widely available. The material for the production method is also particular. Accordingly, the patterned birefringent product that is obtained by the above-described production method has such a property that the product is very difficult to be copied. Resultantly, for example, such patterned birefringent product may be used as a forgery-preventing means. More specifically, for example, the patterned birefringent product may be used as a label or transfer foil having a specific mark (company name, trade mark, or the like)-shaped birefringent pattern.

Besides, the patterned birefringent product may be used as information media by using a visual or optical advantages caused by a characteristic reflection. More specifically, for example, a number string, a character string, one- or two-dimensional bar-code (QR code), symbol, image, or the like can be written as a pattern in the information media thereby incorporating such information into the information media. In that time, it is also possible to select a suitable wavelength of the characteristic reflection in accordance with the usage. For example, if emphasis is put on recognition performance and also a pattern is desired so that the pattern can be easily identified even by visual observation, a birefringent pattern having a characteristic reflection light in the visual region is suitable. In contrast, if a concealed pattern is desired, a birefringent pattern having a characteristic reflection light in the ultraviolet light region or the infrared light region can be used thereby forming a pattern invisible to the eye. The use of the invisible pattern is possible in the field in which information is given to a design of the background without affecting external appearance (for example, a serial number with an invisible pattern is assigned on a gravure picture).

Besides, the birefringent patterned product obtained by the above-described production method may be favorably used for ornamental usages by using characteristics of beautiful color which the characteristic reflection has in a visible region. In this embodiment, it becomes also attractive that a wavelength of the characteristic reflection is changed if looked at from different angles, which results in change of color.

[Identification of Characteristic Reflection Using Circularly-Polarized Light Filter]

The characteristic reflection that is shown by the optically anisotropic layer of the birefringent patterned product causes right circular polarization or left circular polarization (which one is caused varies depending on a birefringent pattern building material or a method of producing the patterned birefringent product). The circularly-polarized light freely passes through the corresponding circular polarization filter (a right circular polarization filter if the polarized light is right circular polarization, and likewise a left circular polarization filter if the polarized light is left circular polarization). In contrast, the circularly-polarized light can not pass through an inverted circular polarization filter (a left circular polarization filter if the polarized light is right circular polarization, and a right circular polarization filter if the polarized light is left circular polarization), so that the circularly-polarized light is absorbed by the filter. Using this nature, by confirming that when an inverted circular polarization filter is superposed on a patterned birefringent product, the characteristic reflection can not be observed, a determination can be made whether or not a pattern is an authentically produced pattern. (In the case of an ordinary reflection light that is not arising from a characteristic reflection, even though an inverted circular polarization filter is superposed on the product, an intensity of the reflection light only drops as much as 50%, but the intensity is not reduced to an unmeasurable level).

(Optical Element)

The patterned birefringent product obtained by the above method can also be used as an optical element. For example, when the patterned birefringent product obtained by the above method is used as a structural optical element, a particular optical element which exhibits effects only against a specific polarized light can be produced. As an example, a diffraction grating produced with the birefringent pattern according to the present invention functions as a polarization separation device which strongly diffracts a specific polarized light, and can be applied to a projector or an optical communication device.

The present invention provides a method in which a patterned birefringent product using a cholesteric structure is produced with efficiency in steps of alignment and patterning, and a birefringent pattern building material used for the method.

According to the production method of the present invention, it is possible to efficiently produce a patterned birefringent product using a cholesteric structure imparting excellent forgery-preventing effect and visual effect. In the present invention, a low molecular liquid crystalline compound is aligned and then polymerized. As a result, in the production of an optically anisotropic layer having a cholesteric structure, it is possible to form an orderly aligned cholesteric liquid crystal phase in a short time. Further, since patterning is performed by exposure to radiation, it is also possible to use a support that is difficult to use for etching. Accordingly, the present invention provides excellent resolution and treatment speed. The products produced by the production method of the present invention are useful for a forgery-preventing means and optical devices.

The birefringent pattern building material of the present invention has an optically anisotropic layer containing a polymer that has been formed by polymerization and fixing after formation of a cholesteric liquid crystal phase, and can be effectively produced. In addition, a patterning can be performed by a patterned light exposure. Further, since the polymerization and fixing can be performed by a heat treatment, the birefringent pattern building material of the present invention has excellent heat resistance.

EXAMPLES

The present invention will be described in more detail based on the following examples. Any materials, reagents, amount and ratio of use and operations, as shown in the examples, may appropriately be modified without departing from the spirit and scope of the present invention. It is therefore understood that the present invention is by no means intended to be limited to the specific examples below.

In the following examples, the birefringent pattern using a cholesteric structure is called "cholesteric pattern".

Example 1

Production of Birefringent Pattern Building Material Showing Green Characteristic Reflection and Cholesteric Pattern Product (Preparation of Coating Liquid for Dynamic Property Controlling Layer CU-1)

The composition below was prepared, filtered through a polypropylene filter having a pore size of 30 μm, and the filtrate was used as a coating liquid for forming a dynamic property controlling layer CU-1.

| Composition of Coating Liquid for Dynamic property controlling Layer | (% by mass) |
|---|---|
| Methyl methacrylate/2-ethylhexyl acrylate/benzyl methacrylate/methacrylic acid copolymer (copolymerization ratio (molar ratio) = 55/30/10/5, mass-average molecular weight = 100,000, Tg: about 70° C.) | 5.89 |
| Styrene/acrylic acid copolymer (copolymerization ratio (molar ratio) = 65/35, mass-average molecular weight = 10,000, Tg: about 100° C.) | 13.74 |
| Dimethacrylate of Ethoxylated Bisphenol A BPE-500 (trade name, manufactured by Shin-Nakamura Chemical Co., Ltd.) | 9.20 |
| Fluorine series surfactant Megafac F-780-F (trade name, manufactured by Dainippon Ink & Chemicals Incorporation) | 0.55 |
| Methanol | 11.22 |
| Propylene glycol monomethyl ether acetate | 6.43 |
| Methyl ethyl ketone | 52.97 |

(Preparation of Coating Liquid for Alignment Layer AL-1)

The composition below was prepared, filtered through a polypropylene filter having a pore size of 30 μm, and the filtrate was used as a coating liquid for forming an alignment layer AL-1.

| Composition of Coating Liquid for Alignment layer | (% by mass) |
|---|---|
| Polyvinyl alcohol (PVA205, trade name, manufactured by KURARAY CO., LTD.) | 3.21 |
| Polyvinylpyrrolidone (Luvitec K30, trade name, manufactured by BASF) | 1.48 |
| Distilled water | 52.10 |
| Methanol | 43.21 |

(Preparation of Coating Liquid for Optically Anisotropic Layer LC-1)

The composition below was prepared, filtered through a polypropylene filter having a pore size of 0.2 μm, and the filtrate was used as coating liquid for forming an optically anisotropic layer LC-1.

LC-1-1 is a rod-like liquid crystalline compound having two reactive groups, one of which is acrylic group, i.e. a radically reactive group, and the other of which is oxetanyl group, i.e. a cationically reactive group.

LC-1-2 is a disk-shaped compound added for the purpose of aligning control. LC-1-2 was synthesized according to the method described in Tetrahedron Lett., Vol. 43, p. 6793 (2002).

The chiral agent (Paliocolor LC756, trade name, manufactured by BASF Japan Ltd.) is an optically active compound having acrylic group as a reactive group

| Composition of Coating Liquid for Optically Anisotropic Layer | (% by mass) |
|---|---|
| Rod-like liquid crystal (LC-1-1) | 32.59 |
| Chiral Agent (Paliocolor LC756, trade name, manufactured by BASF Japan Ltd.) | 1.63 |
| Horizontal aligning agent (LC-1-2) | 0.10 |
| Cationic photopolymerization initiator (CPI100-P, trade name, manufactured by San-Apro Ltd.) | 0.67 |

| Composition of Coating Liquid for Optically Anisotropic Layer | (% by mass) |
|---|---|
| Polymerization control agent (IRGANOX 1076, trade name, manufactured by Ciba Specialty Chemicals Corporation) | 0.07 |
| Methyl ethyl ketone | 66.66 |

(LC-1-1)

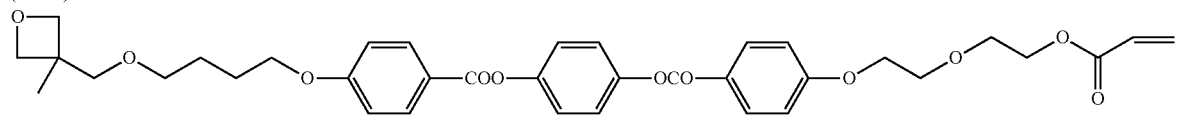

(LC-1-2)

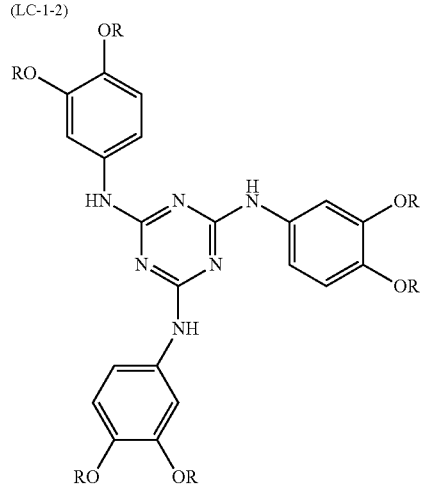

$R = CH_2CH_2OCH_2CH_2C_6F_{13}$ (Preparation of Coating Liquid for Adhesive Layer for Transfer AD-1)

The composition below was prepared, filtered through a polypropylene filter having a pore size of 0.2 μm, and the filtrate was used as coating liquid for forming an adhesive layer for transfer AD-1.

| Composition of Coating Liquid for Adhesive Layer for Transfer | (% by mass) |
|---|---|
| Random copolymer of benzyl methacrylate/methacrylic acid/methyl methacrylate (copolymerization ratio (molar ratio) = 35.9/22.4/41.7, mass-average molecular weight = 38,000) | 8.05 |
| Acrylic polyfunctional monomer (KAYARAD DPHA, trade name, manufactured by Nippon Kayaku Co., Ltd.) | 4.83 |
| Radical polymerization initiator (2-trichloromethyl-5-(p-styrylstyryl)-1,3,4-oxadiazole) | 0.12 |
| Hydroquinone monomethyl ether | 0.002 |
| Fluorine-series surfactant (Megafac F-176PF, trade name, manufactured by Dainippon Ink & Chemicals Incorporation) | 0.05 |
| Propylene glycol monomethyl ether acetate | 34.80 |
| Methyl ethyl ketone | 50.538 |
| Methanol | 1.61 |

(Production of Transferring Material for Producing Cholesteric Pattern TR-1)

To the surface of a temporary support formed of a 75-μm-thick polyethylene terephthalate roll film, the coating liquid for dynamic property controlling layer, CU-1, and the coating liquid for alignment layer, AL-1, in this order were applied by using a wire bar coater and dried. The obtained layers had dry film thickness of 16.0 μm and 1.6 μm, respectively. Next, the coating liquid for optically anisotropic layer, LC-1, was applied to the surface using a wire bar coater, dried under heating at 80° C. of the surface of the film for 2 minutes, to thereby obtain a layer of a cholesteric liquid crystal phase. The coated layer was then illuminated in the air atmosphere by ultraviolet radiation by using a 160 mW/cm², air-cooled metal halide lamp (produce by EYE GRAPHICS Co., Ltd.), so as to fix the alignment state of the phase to thereby obtain a 1.5-μm-thick optically anisotropic layer. In this manner, sample TRC-1 coated with the optically anisotropic layer was prepared. The ultraviolet ray used was 270 mW/cm² illuminance in the range of UV-A (integrated value in the wavelength between 320 nm and 400 nm), and 180 mJ/cm² irradiation amount in the range of UV-A. The optically anisotropic layer in the sample TRC-1 was formed of polymer which was solid at 20° C., and presented MEK (methyl ethyl ketone)-resistance.

Finally, the coating liquid for adhesive layer for transfer, AD-1, was applied to the topsurface of the sample TRC-1, dried to obtain an adhesive layer for transfer of 1.2-μm-thick, which was then pressure-bonded with a protective film (a 12-μm-thick polypropylene film), to thereby obtain a transferring material TR-1 for producing birefringent pattern. Property-modification of the optically anisotropic layer was performed by coating of AD-1.

(Production of Cholesteric Pattern Building Material CPM-1)

A non-alkali glass substrate was cleaned using a rotating nylon-haired brush while spraying a glass cleaner solution conditioned to 25° C. by a shower for 20 seconds. After showered with purified water, the substrate was sprayed with a silane coupling solution [0.3% aqueous solution of N-β-(aminoethyl)-γ-aminopropyl trimethoxysilane, KBM-603, trade name, Shin-Etsu Chemical Co., Ltd.) by a shower for 20 seconds, and then cleaned with a shower of purified water.

The obtained substrate was then heated in a substrate preheating heater at 100° C. for 2 minutes.

The above-described transfer material for producing cholesteric pattern TR-1, after the protective film thereof was delaminated from the material, was laminated on the substrate preheated at 100° C. for 2 minutes by using a laminator (product of Hitachi Industries Co., Ltd. (model Lamic II)) under a rubber roller temperature of 130° C., a line pressure of 100 N/cm, and a conveying velocity of 1.4 m/min. After the lamination, the temporary support was delaminated, to obtain the birefringent pattern building material CPM-1 of the present invention. The cholesteric pattern building material CPM-1 showed a green characteristic reflection, and the peak wavelength of the characteristic reflection was 525 nm and the peak reflectance was 10%. Further, CPM-1 has a temperature at which the characteristic reflection is significantly weakened by temperature-rising (the peak reflectance becomes as much as 30% or less of the peak reflectance at 20° C.). Such temperature (characteristic reflection-disappearance temperature) was about 140° C.

(Production of Cholesteric Pattern CP-1)

The cholesteric pattern building material CPM-1 was subjected to a patterned light exposure by M-3L mask aligner (trade name, manufactured by Mikasa Co., Ltd.) and a photomask with an exposure amount of 30 mJ/cm$^2$.

Next, the cholesteric pattern building material CPM-1 was subjected to a shower development by triethanolamine-based developing solution (containing 2.5% of triethanolamine, nonionic surfactant, and polypropylene-based antifoamer, trade name: T-PD2, manufactured by FUJIFILM Corporation) at 30° C. for 50 seconds with a flat nozzle pressure of 0.04 MPa, to remove the dynamic property controlling layer and the alignment layer.

Thereafter, the cholesteric pattern building material CPM-1 was baked in a clean oven at 230° C. for 15 minutes, to obtain cholesteric pattern CP-1.

In the cholesteric pattern CP-1, only the portion thereof that was exposed at the time of exposure described above showed a green characteristic reflection, and the peak wavelength of the characteristic reflection was 520 nm and the peak reflectance was 13%. In contrast, the unexposed portion did not show any characteristic reflection. Therefore, according to the method of the present invention, it is possible to obtain a cholesteric pattern having a desired pattern by performing an arbitrary patterned light exposure at the time of exposure.

Example 2

Production of Birefringent Pattern Building Material Showing Blue Characteristic Reflection and Cholesteric Pattern Product (Preparation of Coating Liquid for Optically Anisotropic Layer LC-2)

The composition below was prepared, filtered through a polypropylene filter having a pore size of 0.2 μm, and the filtrate was used as coating liquid for forming an optically anisotropic layer LC-2.

| Composition of Coating Liquid for Optically Anisotropic Layer | (% by mass) |
| --- | --- |
| Rod-like liquid crystal (LC-1-1) | 30.67 |
| Chiral Agent (Paliocolor LC756, trade name, manufactured by BASF Japan Ltd.) | 1.83 |
| Horizontal aligning agent (LC-1-2) | 0.10 |

-continued

| Composition of Coating Liquid for Optically Anisotropic Layer | (% by mass) |
| --- | --- |
| Cationic photopolymerization initiator (CPI100-P, trade name, manufactured by San-Apro Ltd.) | 0.67 |
| Polymerization control agent (IRGANOX 1076, trade name, manufactured by Ciba Specialty Chemicals Corporation) | 0.07 |
| Methyl ethyl ketone | 66.66 |

(Production of Cholesteric Pattern Building Material CPM-2)

Transferring material for producing cholesteric pattern, TR-2, was prepared in the same manner as transferring material TR-1 for producing cholesteric pattern, except that the coating liquid LC-2 was used as the coating liquid for optically anisotropic layer, and further cholesteric pattern building material CPM-2 was prepared in the same manner as CPM-1, except that TR-2 was used. The cholesteric pattern building material CPM-2 showed a blue characteristic reflection, and the peak wavelength of the characteristic reflection was 470 nm and the peak reflectance was 10%. The characteristic reflection-disappearance temperature of CPM-2 was about 140° C.

(Production of Cholesteric Pattern CP-2)

Cholesteric Pattern CP-2 was prepared in the same manner as cholesteric Pattern CP-1, except that CPM-2 was used as the cholesteric pattern building material. In the cholesteric pattern CP-2, only the portion thereof that was exposed at the time of exposure described above showed a blue characteristic reflection, and the peak wavelength of the characteristic reflection was 460 nm and the peak reflectance was 14%. In contrast, the unexposed portion did not show any characteristic reflection. Therefore, in this Example 2 just as in Example 1, it is possible to obtain a cholesteric pattern having a desired pattern by performing an arbitrary patterned light exposure at the time of exposure.

Example 3

Production of Birefringent Pattern Building Material Showing Red Characteristic Reflection and Cholesteric Pattern Product (Preparation of Coating Liquid for Optically Anisotropic Layer LC-3)

The composition below was prepared, filtered through a polypropylene filter having a pore size of 0.2 μm, and the filtrate was used as coating liquid for forming an optically anisotropic layer LC-3.

| Composition of Coating Liquid for Optically Anisotropic Layer | (% by mass) |
| --- | --- |
| Rod-like liquid crystal (LC-1-1) | 31.13 |
| Chiral Agent (Paliocolor LC756, trade name, manufactured by BASF Japan Ltd.) | 1.37 |
| Horizontal aligning agent (LC-1-2) | 0.10 |
| Cationic photopolymerization initiator (CPI100-P, trade name, manufactured by San-Apro Ltd.) | 0.67 |
| Polymerization control agent (IRGANOX 1076, trade name, manufactured by Ciba Specialty Chemicals Corporation) | 0.07 |
| Methyl ethyl ketone | 66.66 |

(Production of Cholesteric Pattern Building Material CPM-3)

Transferring material for producing cholesteric pattern, TR-3, was prepared in the same manner as transferring material TR-1 for producing cholesteric pattern, except that the coating liquid LC-3 was used as the coating liquid for optically anisotropic layer, and further cholesteric pattern building material CPM-3 was prepared in the same manner as CPM-1, except that TR-3 was used. The cholesteric pattern building material CPM-3 showed a red characteristic reflection, and the peak wavelength of the characteristic reflection was 680 nm and the peak reflectance was 8%. The characteristic reflection-disappearance temperature of CPM-3 was about 145° C.

(Production of Cholesteric Pattern CP-3)

Cholesteric Pattern CP-3 was prepared in the same manner as cholesteric Pattern CP-1, except that CPM-3 was used as the cholesteric pattern building material. In the cholesteric pattern CP-3, only the portion thereof that was exposed at the time of exposure described above showed a red characteristic reflection, and the peak wavelength of the characteristic reflection was 625 nm and the peak reflectance was 8%. In contrast, the unexposed portion did not show any characteristic reflection. Therefore, in this Example 3 just as in Example 1, it is possible to obtain a cholesteric pattern having a desired pattern by performing an arbitrary patterned light exposure at the time of exposure.

Example 4

Production of Cholesteric Pattern Building Material Showing Characteristic Reflection in Infrared Region and Cholesteric Pattern Product (Preparation of Coating Liquid for Optically Anisotropic Layer LC-4)

The composition below was prepared, filtered through a polypropylene filter having a pore size of 0.2 µm, and the filtrate was used as coating liquid for forming an optically anisotropic layer LC-4.

| Composition of Coating Liquid for Optically Anisotropic Layer | (% by mass) |
|---|---|
| Rod-like liquid crystal (LC-1-1) | 31.33 |
| Chiral Agent (Paliocolor LC756, trade name, manufactured by BASF Japan Ltd.) | 1.17 |
| Horizontal aligning agent (LC-1-2) | 0.10 |
| Cationic photopolymerization initiator (CPI100-P, trade name, manufactured by San-Apro Ltd.) | 0.67 |
| Polymerization control agent (IRGANOX 1076, trade name, manufactured by Ciba Specialty Chemicals Corporation) | 0.07 |
| Methyl ethyl ketone | 66.66 |

(Production of Cholesteric Pattern Building Material CPM-4)

Transferring material for producing cholesteric pattern, TR-4, was prepared in the same manner as Transferring material for producing cholesteric pattern, TR-1, except that the coating liquid LC-4 was used as the coating liquid for optically anisotropic layer, and further cholesteric pattern building material CPM-4 was prepared in the same manner as CPM-1, except that TR-4 was used. The cholesteric pattern building material CPM-4 showed a characteristic reflection in a region from red color to infrared, and the peak wavelength of the characteristic reflection was 770 nm and the peak reflectance was 5%. The characteristic reflection-disappearance temperature of CPM-4 was about 145° C.

(Production of Cholesteric Pattern CP-4)

Cholesteric Pattern CP-4 was prepared in the same manner as cholesteric Pattern CP-1, except that CPM-4 was used as the cholesteric pattern building material. In the cholesteric pattern CP-4, only the portion thereof that was exposed at the time of exposure described above showed a characteristic reflection in a range from red color to infrared, and the peak wavelength of the characteristic reflection was 760 nm and the peak reflectance was 7%. In contrast, the unexposed portion did not show any characteristic reflection. Therefore, in this Example 4 just as in Example 1, it is possible to obtain a cholesteric pattern having a desired pattern by performing an arbitrary patterned light exposure at the time of exposure. Since the cholesteric pattern having a characteristic reflection in the infrared region is ordinarily invisible by the eye, this cholesteric pattern is suitable for printing of secret information, or printing that is desired not to affect the background.

Example 5

Production of Multilayer Cholesteric Pattern by Performing Transfer, Exposure and Baking in a Repetitive Manner (Production of Multilayer Cholesteric Pattern CP-5)

A non-alkali glass substrate was cleaned using a rotating nylon-haired brush while spraying a glass cleaner solution conditioned to 25° C. by a shower for 20 seconds. After showered with purified water, the substrate was sprayed with a silane coupling solution [0.3% aqueous solution of N-β-(aminoethyl)-γ-aminopropyl trimethoxysilane, trade name: KBM-603, produced by Shin-Etsu Chemical Co., Ltd.) by a shower for 20 seconds, and then cleaned with a shower of purified water. The obtained substrate was then heated in a substrate preheating heater at 100° C. for 2 minutes.

The above-described transfer material for producing cholesteric pattern TR-2, after the protective film thereof was delaminated from the transfer material, was laminated on the substrate preheated at 100° C. for 2 minutes by using a laminator (product of Hitachi Industries Co., Ltd. (model Lamic II)) under a rubber roller temperature of 130° C., a line pressure of 100 N/cm, and a conveying velocity of 1.4 m/min.

Figure 4:
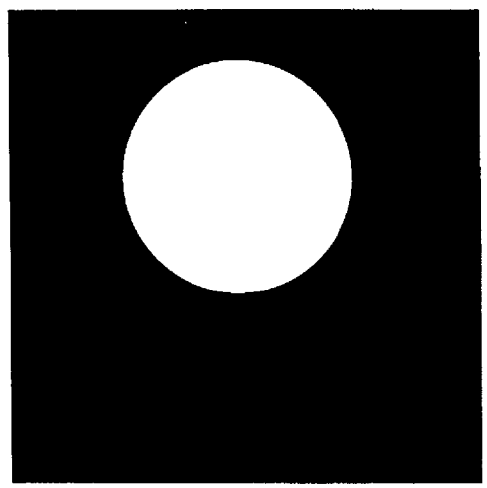
FIGS. 4(*a*) to 4(*c*) are views showing the shapes of three photomasks used in Example 5.
Figure 4:
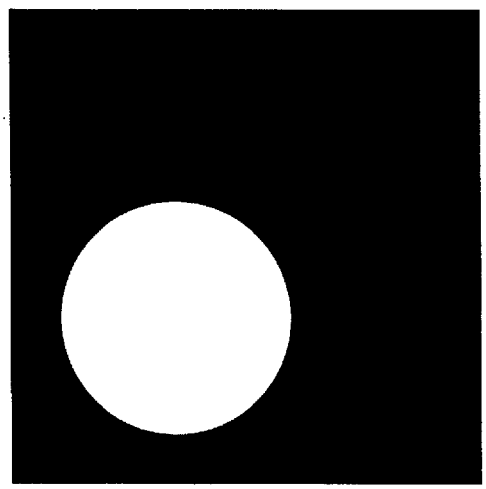
Figure 4:
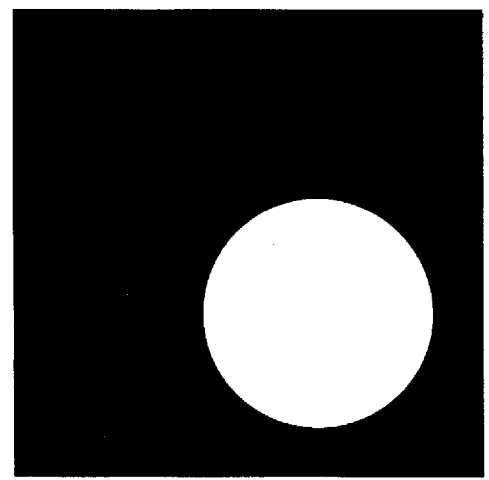

After the lamination, the substrate from which the temporary support had been delaminated was subjected to a patterned light exposure by M-3L mask aligner (trade name, manufactured by Mikasa Co., Ltd.) and the photomask I shown in FIG. 4(a) with an exposure amount of 50 mJ/cm². Thereafter, the substrate was baked in a clean oven at 230° C. for one hour.

On the baked substrate, the transferring material for producing a cholesteric pattern, TR-1, was laminated in the same manner as described above.

After the lamination, the substrate from which the temporary support had been delaminated was subjected to the second patterned light exposure by M-3L mask aligner (trade name, manufactured by Mikasa Co., Ltd.) and the photomask II shown in FIG. 4(b) with an exposure amount of 50 mJ/cm². Thereafter, the substrate was further baked in a clean oven at 230° C. for one hour.

On the baked substrate, the transferring material for producing a cholesteric pattern, TR-3, was laminated in the same manner as described above.

Figure 5:
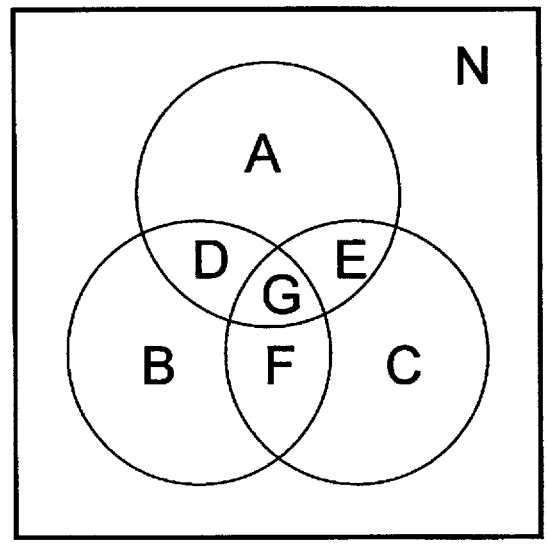
FIG. 5 is a view representing the range showing characteristic reflections of different colors in the samples prepared in Example 5.

After the lamination, the substrate from which the temporary support had been delaminated was subjected to the third patterned light exposure by M-3L mask aligner (trade name, manufactured by Mikasa Co., Ltd.) and the photomask III shown in FIG. 4(c) with an exposure amount of 50 mJ/cm². Thereafter, the substrate was further baked in a clean oven at 230° C. for one hour. Thus, multilayer cholesteric pattern CP-5 according to the present invention was prepared. An overview of CP-5 is shown in FIG. 5. Regions A to G in FIG. 5 each showed a characteristic reflection of color different from each other. Colors of characteristic reflection in each of the regions are shown in Table 1 in relation to existence and non-existence of exposure to the currently used transferring material for producing a cholesteric pattern.

TABLE 1

| Region | Transferring Material used and the presence or absence of exposure | | | Color of Characteristic Reflection |
| --- | --- | --- | --- | --- |
| | TR-2 (blue) | TR-1(green) | TR-3(red) | |
| Region A | existence | nonexistence | nonexistence | blue |
| Region B | nonexistence | existence | nonexistence | green |
| Region C | nonexistence | nonexistence | existence | red |
| Region D | existence | existence | nonexistence | blue green |
| Region E | existence | nonexistence | existence | reddish violet |
| Region F | nonexistence | existence | existence | yellow |
| Region G | existence | existence | existence | white |
| Region N | nonexistence | nonexistence | nonexistence | showing no reflection |

From Table 1, it is understood that the color of characteristic reflection in the exposed region with respect to a plurality of the transferring materials becomes an additive color (intermediate color) of the color of characteristic reflection in respective transferring materials. In view of the above results, the lamination formed by using a plurality of transferring materials for producing a cholesteric pattern makes it possible to produce a pattern showing a wide variety of color of characteristic reflection.

Having described our invention as related to the present embodiments, it is our intention that the present invention not be limited by any of the details of the description, unless otherwise specified, but rather be construed broadly within its spirit and scope as set out in the accompanying claims.

This non-provisional application claims priority under 35 U.S.C. §119(a) on Patent Application No. 2009-179278 filed in Japan on Jul. 30, 2009, which is entirely herein incorporated by reference.

What we claim is:

1. A method of producing a patterned birefringent product, comprising at least steps (1) to (3) in this order:
(1) producing a birefringent pattern building material comprising at least one optically anisotropic layer, which is formed by a process including:
coating and drying a composition containing at least one rod-like liquid crystalline compound having at least two reactive groups and at least one chiral agent to form a cholesteric liquid crystal phase; and then
subjecting the cholesteric liquid crystal phase to heating or exposure to radiation to form the optically anisotropic layer containing a polymer fixed by polymerization and fixing;
(2) subjecting the birefringent pattern building material to a patterned exposure to light; and,
(3) baking a laminate obtained after the step (2) at 50° C. or higher and 400° C. or lower;
wherein the optically anisotropic layer shows a characteristic reflection, arising from a cholesteric structure, to a circularly-polarized light of wavelength λ, that is determined by the following formula:

$\lambda = n \cdot p$, in which $p$ represents a cholesteric pitch and $n$ represents an average refractive index in each layer; and wherein the characteristic reflection shows a peak wavelength of 50 nm to 3000 nm, and a peak reflectance of 2% to 100%.

2. The method according to claim 1, wherein the peak wavelength of the characteristic reflection is in the range of 300 nm to 1600 nm.

3. The method according to claim 1, wherein a cholesteric pitch of the optically anisotropic layer is in the range of 100 nm or more and 2000 nm or less.

4. The method according to claim 1, wherein a characteristic reflection-disappearance temperature of the optically anisotropic layer is in the range of temperature higher than 20° C.

5. The method according to claim 4, wherein the step (3) is carried out at a temperature equal to or higher than the characteristic reflection-disappearance temperature.

6. The method according to claim 1, wherein the polymer has a reactive group that is remaining as an unreacted group.

7. The method according to claim 1, wherein the rod-like liquid crystalline compound has two or more types of reactive groups each of which has different polymerization condition.

8. The method according to claim 7, wherein the rod-like liquid crystalline compound has at least a radically reactive group and a cationically reactive group.

9. The method according to claim 8, wherein the radically reactive group is an acrylic group and/or a methacrylic group, and the cationically reactive group is a vinyl ether group, an oxetanyl group, or an epoxy group.

10. The method according to claim 1, wherein a concentration of the at least one chiral agent in the composition is in the range of 0.5% by mass or more and 20% by mass or less in terms of solid content.

11. The method according to claim 1, wherein at least one of the at least one chiral agent has at least one reactive group.

12. The method according to claim 1, wherein the optically anisotropic layer is modified after being polymerized and fixed.

13. The method according to claim 12, wherein the property modification is performed by contact or immersing of a solution containing at least one of supplementary additives.

14. The method according to claim 13, wherein the at least one of supplementary additives is a photopolymerization initiator.

15. The method according to any one of claim 12, wherein the property modification is performed in association with the step of laminating another functional layer on the optically anisotropic layer.

16. The method according to claim 1, wherein the step (1) is performed by transferring a transferring material containing the at least one optically anisotropic layer, onto a target transferring material, the transferring material is formed by a process including:
forming a cholesteric liquid crystal phase by coating and drying a composition containing at least one rod-like liquid crystalline compound having at least two types of reactive groups each of which has different polymerization condition and at least one chiral agent; and,
subjecting the cholesteric liquid crystal phase to heating or exposure to radiation to form the optically anisotropic layer containing a polymer fixed by polymerization and fixing.

17. The method according to claim 16, wherein the transferring material has at least (A) an optically anisotropic layer and (B) a transferring adhesive layer laminated in this order on a temporary support.

18. A product used as a means of preventing forgery, which is obtainable from the method according to claim 1.

19. An optical element, which is obtainable from the method according to claim 1.

20. A birefringent pattern building material having at least one optically anisotropic layer containing a polymer material that is obtained by a process including:
- forming a cholesteric liquid crystal phase by coating and drying a composition containing at least one rod-like liquid crystalline compound having at least two types of reactive groups each of which has different polymerization condition and at least one chiral agent; and
- subjecting the cholesteric liquid crystal phase to heating or exposure to radiation to form the optically anisotropic layer containing a polymer fixed by polymerization and fixing.

* * * * *